US012570678B2

(12) United States Patent
Sa et al.

(10) Patent No.: US 12,570,678 B2
(45) **Date of Patent: *Mar. 10, 2026**

(54) LIGAND COMPOUND, TRANSITION METAL COMPOUND, AND CATALYST COMPOSITION INCLUDING THE SAME

(71) Applicant: LG Chem, Ltd., Seoul (KR)

(72) Inventors: Seok Pil Sa, Daejeon (KR); Eun Ji Shin, Daejeon (KR); Seul Ki Im, Daejeon (KR); Hyun Mo Lee, Daejeon (KR); Ki Soo Lee, Daejeon (KR); Bun Yeoul Lee, Gyeonggi-do (KR); Kyung Lee Park, Seoul (KR)

(73) Assignee: LG Chem, Ltd., Seoul (KR)

( * ) Notice: Subject to any disclaimer, the term of this patent is extended or adjusted under 35 U.S.C. 154(b) by 624 days.

This patent is subject to a terminal disclaimer.

(21) Appl. No.: 17/780,300

(22) PCT Filed: Apr. 16, 2021

(86) PCT No.: PCT/KR2021/004813

§ 371 (c)(1),
(2) Date: May 26, 2022

(87) PCT Pub. No.: WO2021/210948

PCT Pub. Date: Oct. 21, 2021

(65) Prior Publication Data

US 2023/0093294 A1 Mar. 23, 2023

(30) Foreign Application Priority Data

Apr. 16, 2020 (KR) ........................ 10-2020-0046030

(51) Int. Cl.

*C07F 7/28* (2006.01)
*B01J 31/18* (2006.01)
*C08F 4/64* (2006.01)
*C08F 4/659* (2006.01)

(52) U.S. Cl.

CPC ............. *C07F 7/28* (2013.01); *B01J 31/1825* (2013.01); *C08F 4/64* (2013.01); *C08F 4/65912* (2013.01)

(58) Field of Classification Search

CPC .................................... C07F 7/00; C07F 7/28
See application file for complete search history.

(56) References Cited

U.S. PATENT DOCUMENTS 7,579,407 B2 8/2009 Tau et al.
7,858,718 B1 12/2010 Nagy et al.
8,148,482 B2 * 4/2012 Busico .................... C08F 10/00 525/247
2002/0137845 A1 * 9/2002 Boussie .................... C07F 7/00 525/170
2003/0194575 A1 10/2003 Tau et al.
2004/0082750 A1 4/2004 Tau et al.
2004/0220050 A1 * 11/2004 Frazier .................... C08F 10/00 502/155
2005/0054800 A1 3/2005 Tau et al.
2006/0004167 A1 1/2006 Tau et al.
2006/0247483 A1 11/2006 McConville et al.
2007/0249798 A1 10/2007 Stevens et al.
2008/0293899 A1 11/2008 McConville et al.
2010/0222516 A1 * 9/2010 Busico .................... C08F 10/00 525/240
2015/0057415 A1 2/2015 Ohtaki et al.
2018/0201697 A1 7/2018 Choe et al.
2021/0002303 A1 1/2021 Sa et al.
2023/0116142 A1 * 4/2023 Im ....................... C08F 297/086 526/170
2024/0182693 A1 * 6/2024 Kim ........................ C08L 23/12
2024/0352176 A1 * 10/2024 Cho ...................... C08F 210/00

(Continued)

FOREIGN PATENT DOCUMENTS

CN 101319050 A 12/2008
CN 104968692 A 10/2015
EP 2953984 A1 12/2015

(Continued)

OTHER PUBLICATIONS

K. Park et al., 12 Polymers, 1-18 (2020) (Year: 2020).*
Extended European Search Report including Written Opinion for Application No. 21788545.8 dated Dec. 14, 2022, pp. 1-13.
Search report from International Application No. PCT/KR2021/004813, mailed Jul. 21, 2021.
Domski, G. J., et al., Combined Experimental and Theoretical Approach for Living and Isoselec Propylene Polymerization. ACS Catalalysis, Aug. 18, 2017.vol. 7, No. 10, pp. 6930-6937.
Park, K. L., et al., "Preparation of Pyridylamido Hafnium Complexes for Coordinative Chain Transfer Polymerization." Polymers, May 11, 2020, vol. 12, No. 5, Article No. 1100, inner pp. 1-18.

*Primary Examiner* — Alexander R Pagano
(74) *Attorney, Agent, or Firm* — Lerner David LLP

(57) ABSTRACT

The present invention relates to a ligand compound having a novel structure of the following, a transition metal compound and a catalyst composition including the same:

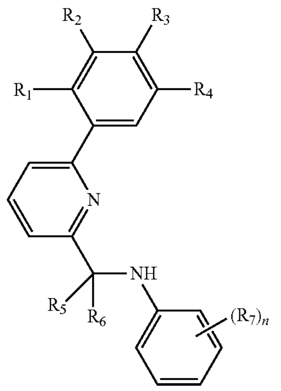

Wherein $R_1$ to $R_7$, and n are described herein.

9 Claims, 9 Drawing Sheets

(56) References Cited

U.S. PATENT DOCUMENTS

| | | | | |
|---|---|---|---|---|
| 2024/0360265 | A1 * | 10/2024 | Park | C08F 297/02 |
| 2024/0360266 | A1 * | 10/2024 | Im | C08F 297/02 |

FOREIGN PATENT DOCUMENTS

| | | | | |
|---|---|---|---|---|
| EP | 3321291 | A1 | 5/2018 | |
| JP | 2005008734 | A | 1/2005 | |
| JP | 2005508415 | A | 3/2005 | |
| KR | 20140100464 | A | 8/2014 | |
| KR | 101848781 | B1 | 4/2018 | |
| KR | 20180053037 | A | 5/2018 | |
| KR | 20180055531 | A | 5/2018 | |
| KR | 20190114716 | A | 10/2019 | |
| WO | 0246249 | A2 | 6/2002 | |
| WO | 03040201 | A1 | 5/2003 | |
| WO | WO-2005090427 | A2 * | 9/2005 | B32B 27/06 |
| WO | 2006096881 | A1 | 9/2006 | |
| WO | WO-2008112133 | A2 * | 9/2008 | A61K 31/7072 |
| WO | 2011011041 | A1 | 1/2011 | |
| WO | 2019190289 | A1 | 10/2019 | |

* cited by examiner

LIGAND COMPOUND, TRANSITION METAL COMPOUND, AND CATALYST COMPOSITION INCLUDING THE SAME

CROSS-REFERENCE TO RELATED APPLICATIONS

The present application is a national stage entry under 35 U.S.C. § 371 of International Application No. PCT/KR2021/004813 filed on Apr. 16, 2021, which claims priority from Korean Patent Application No. 10-2020-0046030 filed on Apr. 16, 2020, all the disclosures of which are incorporated herein by reference.

TECHNICAL FIELD

The present invention relates to a ligand compound having a novel structure, a transition metal compound, and a catalyst composition including the same.

BACKGROUND ART

Transition metal pincer complexes have been widely applied in the field of organometallic catalysis. Tridentate chelating pincer ligands are combined with a metal to form a planar structure with the metal at the center. Ligand-metal interaction is rigid and inflexible, and thus, high stability is provided.

For homogeneous olefin polymerization, the initial Zr-based metallocene catalyst developed in to Ti-based half-metallocene, and finally to a post-metallocene having a bicyclopentadienyl ligand. Among the post-metallocenes developed, the pincer-type [$C^{naphthyl}$, $N^{pyridine}$, $N^{amido}$] $HfMe_2$ complex is a main catalyst. This complex has been developed in the early 2000s through high-throughput screening and has been extensively researched, and is applied in commercial processes.

Such a complex may introduce a large amount of alpha-olefin in an ethylene/alpha-olefin copolymerization, and may control the tacticity of propylene polymerization for preparing isotactic polypropylene. Another advantage of this complex is the lack of β-elimination process, which is a unique chain transfer reaction inevitable in olefin polymerization using the conventional Zr-based metallocene and Ti-based half-metallocene catalysts. Due to such characteristics, a polyolefin chain may be grown from an Hf-site, and transferred to a chain transfer agent such as diethylzinc (Et2Zn) to grow uniform polyolefin chains. Such a process is referred to as coordinative chain transfer polymerization (CCTP). CCTP technique may be utilized for the commercial production of an olefin block copolymer.

In addition, a polyolefin-polystyrene block copolymer may be synthesized through the anionic polymerization of styrene using a complex in a reaction after CCTP. As described above, a transition metal compound including a hafnium metal may be useful as a catalyst for producing olefin based polymers, and a great deal of research for improving catalyst performance by modifying thereof is being conducted.

PRIOR ART DOCUMENT

Patent Document

Korean Laid-open Patent No. 10-2018-0055531

DISCLOSURE OF THE INVENTION

Technical Problem

An object of the present invention is to provide a novel transition metal compound, a ligand compound and a catalyst composition including the same.

Technical Solution

In order to solve the above-described tasks, the present invention provides a transition metal compound represented by the following Formula 1:

[Formula 1]

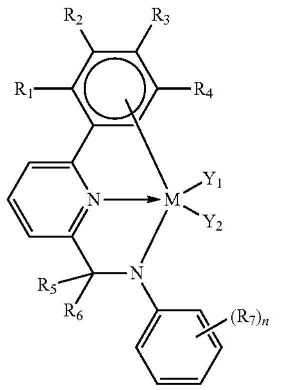

in Formula 1,

M is Ti, Zr or Hf, $R_1$ to $R_4$ are each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where adjacent two or more among them may be connected from each other to form a ring, $R_5$ and $R_6$ are each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where the substitution is conducted with an alkyl group of 1 to 12 carbon atoms, each $R_7$ is independently a substituted or unsubstituted alkyl group of 4 to 20 carbon atoms; a substituted or unsubstituted cycloalkyl group of 4 to 20 carbon atoms; or a substituted or unsubstituted aryl group of 6 to 20 carbon atoms, n is 1 to 5, and $Y_1$ and $Y_2$ are each independently a halogen group; a substituted or unsubstituted alkyl group of 1 to 20 carbon atoms; a substituted or unsubstituted alkenyl group of 2 to 20 carbon atoms; a substituted or unsubstituted alkynyl group or 2 to 20 carbon atoms; a substituted or unsubstituted cycloalkyl group of 3 to 20 carbon atoms; a substituted or unsubstituted aryl group of 6 to 20 carbon atoms; a substituted or unsubstituted alkylaryl group of 7 to 20 carbon atoms; a substituted or unsubstituted arylalkyl group of 7 to 20 carbon atoms; a substituted or unsubstituted heteroaryl group of 5 to 20 carbon atoms; a substituted or unsubstituted alkoxy group of 1 to 20 carbon atoms; a substituted or unsubstituted aryloxy group of 6 to 20 carbon atoms; a substituted or unsubstituted alkylamino group of 1 to 20 carbon atoms; a substituted or unsubstituted arylamino group of 5 to 20 carbon atoms; a substituted or unsubstituted alkylthio group of 1 to 20 carbon atoms; a substituted or unsubstituted arylthio group of 5 to 20 carbon atoms; a substituted or unsubstituted alkylsilyl group of 1 to 20 carbon atoms; a substituted or unsubstituted arylsilyl group of 5 to 20 carbon atoms; a hydroxyl group; an amino group; a thio group; a silyl group; a cyano group; or a nitro group.

In addition, an embodiment of the present invention provides a catalyst composition including the transition metal compound represented by Formula 1 and a cocatalyst.

In addition, an embodiment of the present invention provides a method for preparing on olefin polymer, including polymerizing an olefin monomer in the presence of the catalyst composition.

Advantageous Effects

The novel transition metal compound of the present invention may be useful as a catalyst of polymerization reaction for preparing an olefin polymer having a high molecular weight.

BEST MODE FOR CARRYING OUT THE INVENTION

Figure 1:
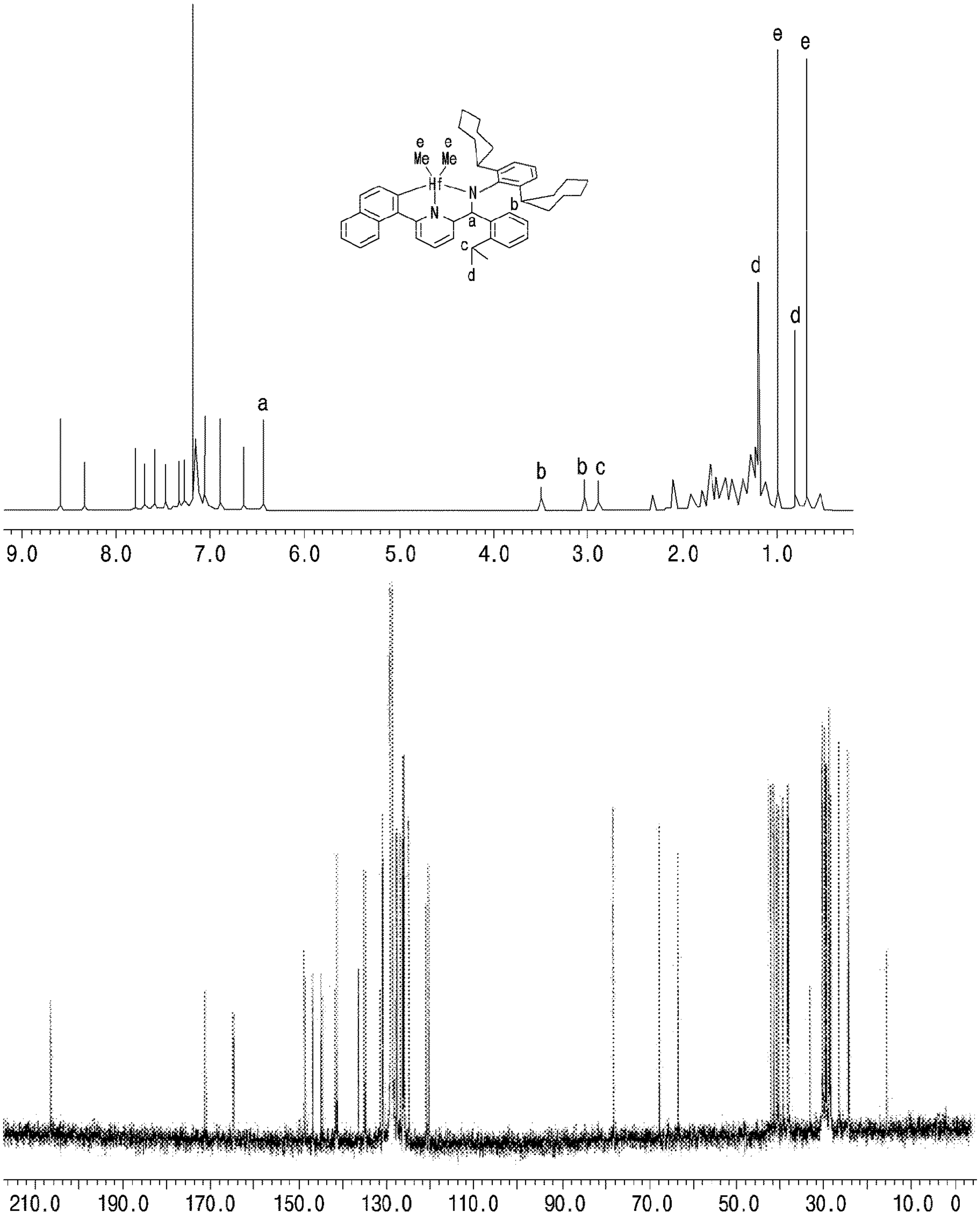
FIG. 1 shows a $^1H$ NMR spectrum and a $^{13}C$ NMR spectrum of Example 1.

Hereinafter, the present invention will be explained in more detail to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

In the present invention, "alkyl" means a hydrocarbon residue of a linear chain or a branched chain.

In the present invention, "alkenyl" means an alkenyl group of a linear chain or a branched chain.

In the present invention, "aryl" preferably has 6 to 20 carbon atoms, and particularly includes phenyl, naphthyl, anthracenyl, dimethylanilinyl, anisolyl, etc., without limitation.

In the present invention, "alkylaryl" means an aryl group substituted with the alkyl group.

In the present invention, "arylalkyl" means an alkyl group substituted with the aryl group.

In the present invention, "alkylsilyl" may be silyl substituted with alkyl of 1 to 20 carbon atoms, for example, trimethylsilyl or triethylsilyl.

In the present invention, "alkylamino" means an amino group substituted with the alkyl group and includes a dimethylamino group, a diethylamino group, etc., but is not limited thereto.

In the present invention, "hydrocarbyl" means a monovalent hydrocarbon group of 1 to 20 carbon atoms, composed of only carbon and hydrogen irrespective of its structure, including alkyl, aryl, alkenyl, alkynyl, cycloalkyl, alkylaryl or arylalkyl.

An embodiment of the present invention provides a transition metal compound represented by the following Formula 1:

[Formula 1]

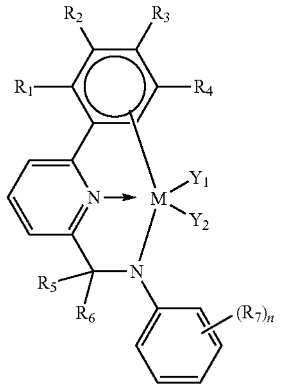

in Formula 1,

M is Ti, Zr or Hf, $R_1$ to $R_4$ are each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where adjacent two or more among them may be connected from each other to form a ring, $R_5$ and $R_6$ are each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where the substitution is conducted with an alkyl group of 1 to 12 carbon atoms, each $R_7$ is independently a substituted or unsubstituted alkyl group of 4 to 20 carbon atoms; a substituted or unsubstituted cycloalkyl group of 4 to 20 carbon atoms; or a substituted or unsubstituted aryl group of 6 to 20 carbon atoms, n is 1 to 5, and $Y_1$ and $Y_2$ are each independently a halogen group; a substituted or unsubstituted alkyl group of 1 to 20 carbon atoms; a substituted or unsubstituted alkenyl group of 2 to 20 carbon atoms; a substituted or unsubstituted alkynyl group or 2 to 20 carbon atoms; a substituted or unsubstituted cycloalkyl group of 3 to 20 carbon atoms; a substituted or unsubstituted aryl group of 6 to 20 carbon atoms; a substituted or unsubstituted alkylaryl group of 7 to 20 carbon atoms; a substituted or unsubstituted arylalkyl group of 7 to 20 carbon atoms; a substituted or unsubstituted heteroaryl group of 5 to 20 carbon atoms; a substituted or unsubstituted alkoxy group of 1 to 20 carbon atoms; a substituted or unsubstituted aryloxy group of 6 to 20 carbon atoms; a substituted or unsubstituted alkylamino group of 1 to 20 carbon atoms; a substituted or unsubstituted arylamino group of 5 to 20 carbon atoms; a substituted or unsubstituted alkylthio group of 1 to 20 carbon atoms; a substituted or unsubstituted arylthio group of 5 to 20 carbon atoms; a substituted or unsubstituted alkylsilyl group of 1 to 20 carbon atoms; a substituted or unsubstituted arylsilyl group of 5 to 20 carbon atoms; a hydroxyl group; an amino group; a thio group; a silyl group; a cyano group; or a nitro group.

If polymerization reaction is performed in the presence of an excessive amount of a chain transfer agent (for example, $(Et)_2Zn$) with respect to a catalyst, an olefin polymer chain may undergo rapid transalkylation between zinc (Zn) and hafnium (Hf) for uniform propagation from dialkylzinc to accomplish living polymerization, and this is referred to as coordinative chain transfer polymerization (CCTP). The conventionally used metallocene catalysts precluded living polymerization due to a β-elimination process, and a small number of catalysts well-known as being applicable to CCTP enabled only homopolymerization of ethylene but made the copolymerization of ethylene and alpha-olefin through CCTP very difficult. Accordingly, the living polymerization through CCTP using a common transition metal compound as a catalyst to prepare a block copolymer was difficult.

The transition metal compound of the present invention is characterized in including a bulky functional group for $R_7$ in Formula 1, and through this, high catalyst activity was accomplished. In case of positioning a functional group having a small size, for example, an isopropyl group, for $R_7$, the isopropyl group and a hafnium compound may react, and catalyst deactivation reaction may be carried out, on the contrary, the functional group positioned at $R_7$ effectively reduces the deactivation reaction of the compound of the present invention and improves stability, as well as reducing the activation energy in polymerization reaction and showing excellent catalyst activity.

As described above, the transition metal compound of the present invention may be usefully used as a catalyst for preparing an olefin polymer, and this is intrinsic characteristic for accomplishing by the novel structure of the compound newly developed in the present invention.

Particularly, in Formula 1, M may be Hf.

Particularly, in Formula 1, $R_1$ to $R_4$ are each independently hydrogen; or a substituted or unsubstituted alkyl group of 1 to 20 carbon atoms; where adjacent two or more among them may be connected from each other to form a ring, or $R_1$ and $R_2$ are each independently an alkyl group of 1 to 20 carbon atoms and are connected from each other to form an aromatic ring of 5 to 20 carbon atoms, and $R_3$ and $R_4$ may be hydrogen.

Particularly, in Formula 1, $R_5$ and $R_6$ may be each independently hydrogen; or a substituted or unsubstituted aryl group of 6 to 20 carbon atoms, where the substitution is conducted with an alkyl group of 1 to 6 carbon atoms.

Particularly, in Formula 1, each $R_7$ may be independently a substituted or unsubstituted alkyl group of 4 to 20 carbon atoms; a substituted or unsubstituted cycloalkyl group of 4 to 20 carbon atoms; or a substituted or unsubstituted aryl group of 6 to 20 carbon atoms.

Particularly, in Formula 1, n may be 1 to 3, preferably, 2.

Particularly, in Formula 1, $Y_1$ and $Y_2$ may be each independently an alkyl group of 1 to 20 carbon atoms.

More particularly, the transition metal compound represented by Formula 1 may be a compound represented by the following Formula 1a:

[Formula 1a]

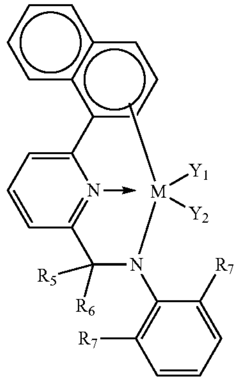

in Formula 1a,

M, $R_5$ to $R_7$, $Y_1$ and $Y_2$ are the same as defined above.

The transition metal compound represented by Formula 1 may particularly be selected from the compounds below, but all transition metal compounds corresponding to Formula 1 are included in the present invention, without limitation.

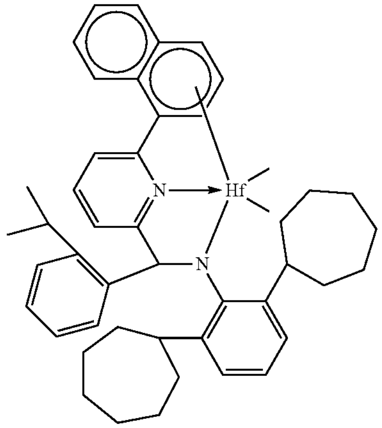

-continued
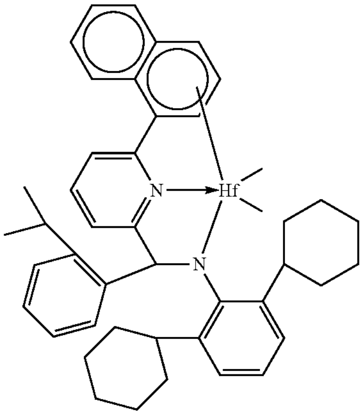
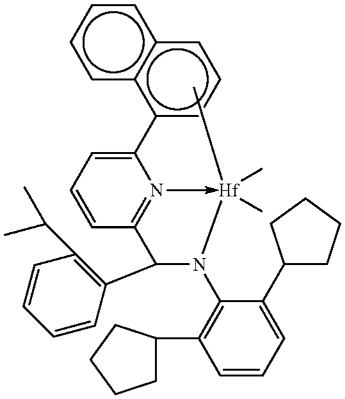
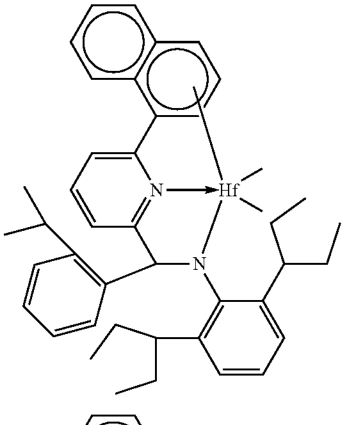
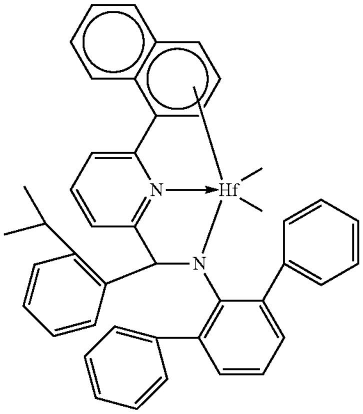
-continued
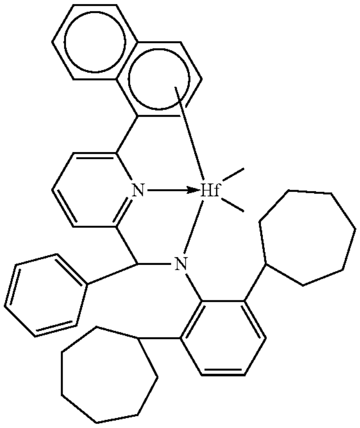
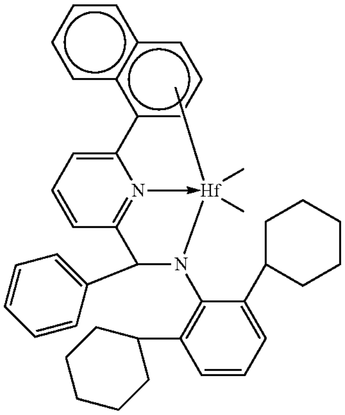
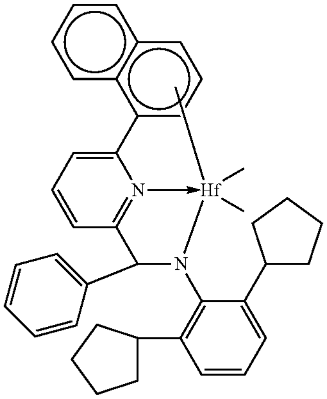
In addition, the present invention provides a ligand compound represented by the following Formula 2:

[Formula 2]

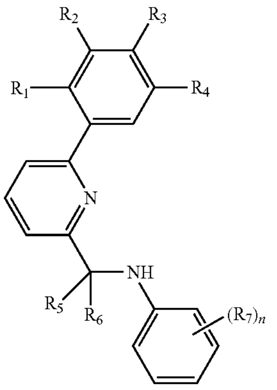

in Formula 2, $R_1$ to $R_4$ are each independently hydrogen, a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where adjacent two or more among them may be connected from each other to for a ring, $R_5$ and $R_6$ are each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where the substitution is conducted with an alkyl group of 1 to 12 carbon atoms, each $R_7$ is independently a substituted or unsubstituted alkyl group of 4 to 20 carbon atoms; a substituted or unsubstituted cycloalkyl group of 4 to 20 carbon atoms; or a substituted or unsubstituted aryl group of 6 to 20 carbon atoms, and n is 1 to 5.

That is, the transition metal compound of the present invention may be prepared by including: reacting a ligand compound represented by the following Formula 2 and a compound represented by the following Formula 3:

[Formula 2]

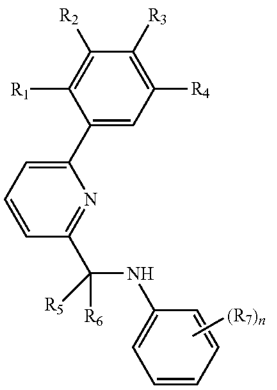

[Formula 3]

$M(Y_1Y_2)_2$ in the above formulae, $R_1$ to $R_7$, M, $Y_1$ and $Y_2$ are the same as defined above.

Meanwhile, when preparing the transition metal compound represented by Formula 1 of the present invention, reaction may be performed by a process below.

[Reaction 1]

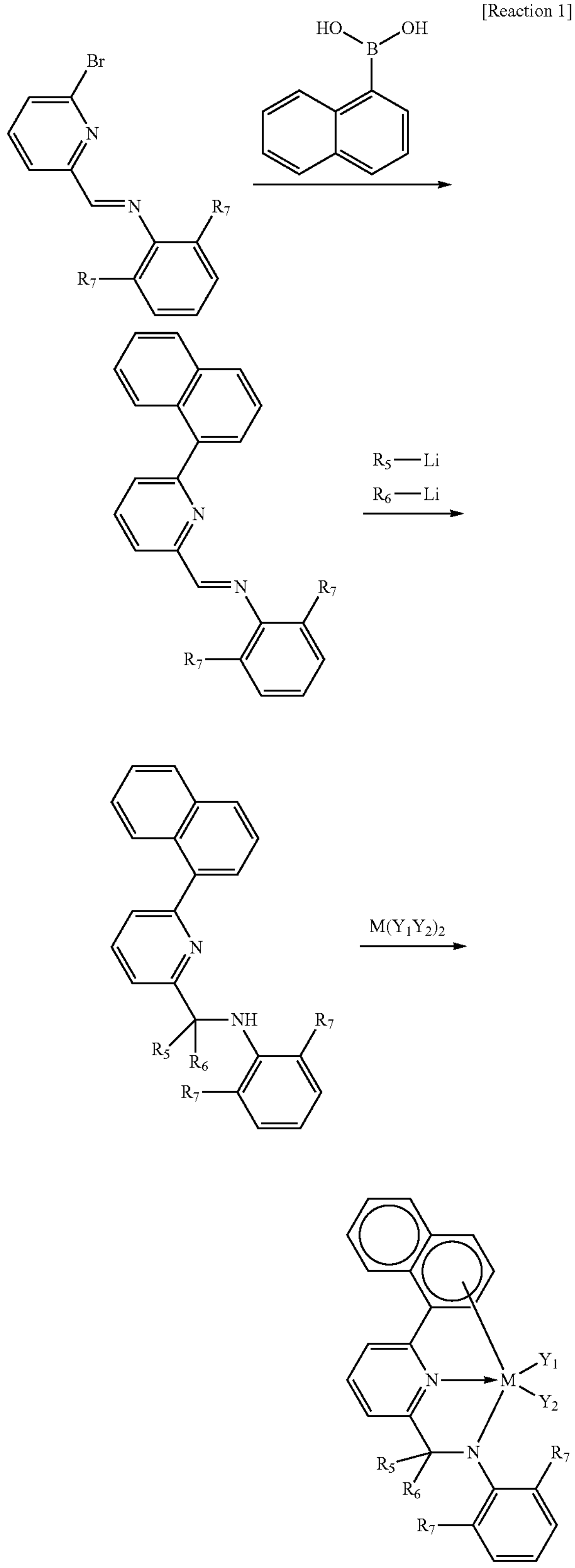

-continued

[Reaction 2]

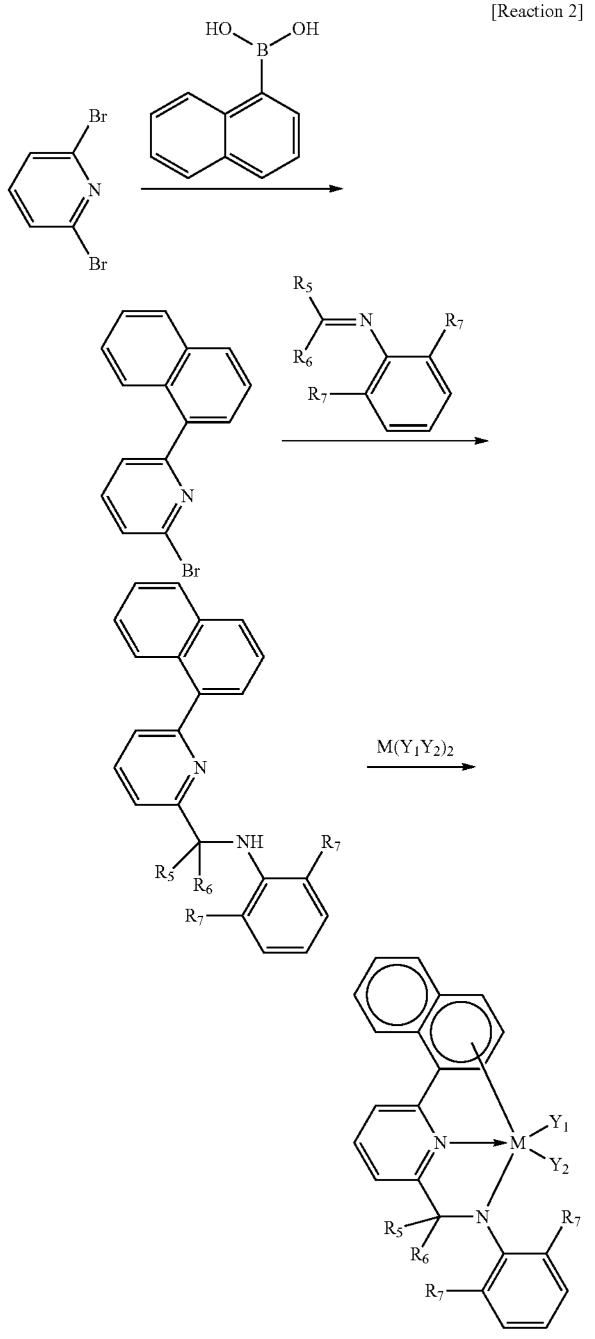

The catalyst composition of the present invention is characterized in including the transition metal compound represented by Formula 1 and a cocatalyst.

In the present invention, the "composition" includes a mixture of materials including a corresponding composition as well as a reaction product and decomposition product formed from the materials of the corresponding composition.

The cocatalyst may use any one well-known in the art, for example, one or more selected among the following Formulae 4 to 6 may be used as the cocatalyst:

$$—[Al(R_a)—O]_m— \quad \text{[Formula 4]}$$

$$D(R_a)_3 \quad \text{[Formula 5]}$$

$$[L\text{-}H]^+[Z(A)_4]^- \text{ or } [L]^+[Z(A)_4]^- \quad \text{[Formula 6]}$$

in the above formulae, each $R_a$ is independently a halogen radical; a hydrocarbyl radical of 1 to 20 carbon atoms; or a halogen-substituted hydrocarbyl radical of 1 to 20 carbon atoms, m is an integer of 2 or more, D is aluminum or boron, L is a neutral or cationic Lewis acid, Z is an element in group 13;

each A is independently an aryl group of 6 to 20 carbon atoms or an alkyl group of 1 to 20 carbon atoms, where one or more hydrogen atoms may be substituted with substituents; and the substituent of A is a halogen group; a hydrocarbyl group of 1 to 20 carbon atoms; an alkoxy group of 1 to 20 carbon atoms; or an aryloxy group of 6 to 20 carbon atoms.

The compound represented by Formula 4 is not specifically limited as long as it is alkylaluminoxane. Preferable examples may include methylaluminoxane, ethylaluminoxane, isobutylaluminoxane, butylaluminoxane, etc., particularly preferably, methylaluminoxane.

The compound represented by Formula 5 is not specifically limited, and preferable examples thereof may include trimethylaluminum, triethylaluminum, triisobutylaluminum, tripropylaluminum, tributylaluminum, dimethylchloroaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and particularly preferably, be selected from trimethylaluminum, triethylaluminum, and triisobutylaluminum.

Examples of the compound represented by Formula 6, if Z is boron, may include, for example, dioctadecylmethylammonium tetrakis(pentafluorophenyl)borate $[(C_{18}H_{37})_2N(H)Me]^+[B(C_6F_5)_4]^-$, dioctadecylmethylammonium, tetrakis(phenyl)borate, dioctadecylmethylammonium tetrakis[3,5-bis(trifluoromethyl)phenyl]borate, triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl) borate, tributylammonium tetra(p-trifluoromethylphenyl)borate, trimethylammonium tetra(p-trifluoromethylphenyl)borate, tributylammonium tetrapentafluorophenylborate, N,N-diethylanilidium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, tripropylammonium tetra(p-tolyl)borate, triethylammonium tetra(o,p-dimethylphenyl)borate, trimethylammonium tetra (o,p-dimethylphenyl)borate, triphenylcarbonium tetra(p-trifluoromethylphenyl)borate, triphenylcarbonium tetrapentafluorophenylborate, or combinations thereof, if Z is aluminum, for example, triethylammonium tetraphenylaluminum, tributylammonium tetraphenylaluminum, trimethylammonium tetraphenylaluminum, tripropylammonium tetraphenylaluminum, trimethylammonium tetra(p-tolyl) aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl) aluminum, tributylammonium tetrapentafluorophenylaluminum, N,N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, triethylammonium tetraphenylaluminum, tributylammonium tetraphenylaluminum, or combinations thereof, without limitation.

Particularly, the cocatalyst used in the present invention may be the compound represented by Formula 6, particularly, dioctadecylmethylammonium tetrakis(pentafluorophenyl)borate.

In addition, the transition metal compound represented by Formula 1 and the cocatalyst may be used in a supported type by a support. Silica or alumina may be used as the support, without limitation.

The method for preparing an olefin polymer of the present invention is characterized in including a step of polymerizing an olefin monomer in the presence of the catalyst composition.

In the present invention, the "polymer" refers to a polymer compound prepared by polymerizing monomers of the same or different types. Such a general term of polymer includes the term of homopolymer used for referring to a polymer prepared from only one type of monomer and the term of interpolymer specified as follows.

In the present invention, the term "interpolymer" refers to a polymer prepared by polymerizing at least two different types of monomers. Like this, a general term of interpolymer refers to a polymer prepared from two different types of monomers and includes a commonly used copolymer and a polymer prepared from two or more different types of monomers.

In the present invention, the olefin monomer may be one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene and 1-eicosene, without limitation.

Particularly, the olefin polymer of the present invention may be an olefin homopolymer, or an olefin-alpha-olefin copolymer according to the type of the olefin monomer, and preferably, may be an ethylene/alpha-olefin copolymer.

In this case, the amount of the alpha-olefin monomer, which is a comonomer, may be suitably selected according to the use, purpose, etc., of the olefin polymer by a person skilled in the art, and may be about 1 to 99 mol %.

The catalyst composition may be injected after being dissolved or diluted in an aliphatic hydrocarbon solvent of 5 to 12 carbon atoms such as pentane, hexane, heptane, nonane, decane, isomers thereof, an aromatic hydrocarbon solvent such as toluene and benzene, or a hydrocarbon solvent substituted with a chlorine atom such as dichloromethane and chlorobenzene, which are suitable for an olefin polymerization process. The solvent used herein may preferably be used after removing a small amount of water or air, which functions as a catalyst poison, by treating with a small amount of alkylaluminum, and may be treated by further using a cocatalyst.

The most preferable preparation process using the catalyst composition is a solution process, and if the composition is used together with an inorganic support such as silica, it may also be applied to a slurry process or a gas phase process.

The polymerization may be performed by homopolymerizing one type of olefin monomer or copolymerizing two or more olefin monomers by using one of a continuous slurry polymerization reactor, a loop slurry reactor, a gas phase reactor, or a solution reactor.

In addition, to remove moisture in the reactor during performing polymerization reaction, an organoaluminum compound may be further injected, and the polymerization reaction may be performed in the presence thereof. Particular examples of such organoaluminum compound may include trialkylaluminum, dialkylaluminum halide, alkylaluminum dihalide, aluminum dialkyl hydride or alkyl aluminum sesquihalide, and more particular examples thereof may include $Al(C_2H_5)_3$, $Al(C_2H_5)_2H$, $Al(C_3H_7)_3$, $Al(C_3H_7)_2H$, $Al(i\text{-}C_4H_9)_2H$, $Al(C_8H_{17})_3$, $Al(C_{12}H_{25})_3$, $Al(C_2H_5)(C_{12}H_{25})_2$, $Al(i\text{-}C_4H_9)(C_{12}H_{25})$ $Al(i\text{-}C_4H_9)_2H$, $Al(i\text{-}C_4H_9)_3$, $(C_2H_5)_2AlCl$, $(i\text{-}C_3H_9)_2AlCl$ or $(C_2H_5)_3Al_2Cl_3$. Such an organoaluminum compound may be continuously injected to the reactor, or may be injected in a ratio of about 0.1 to 10 mol per 1 kg of a reaction medium which is injected to the reactor for suitable removal of moisture.

According to an embodiment of the present invention, the polymerization of the olefin polymer may be performed under conditions of a temperature of about 80 to 200° C., particularly, a temperature of about 90 to 200° C., or a temperature of about 130 to 200° C., and a pressure of about 20 to 100 bar, particularly, a pressure of about 20 to 50 bar, or a pressure of about 20 to 40 bar, for about 8 minutes to 2 hours.

EXAMPLES

Hereinafter, the present invention will be explained in more detail referring to the examples. However, the examples are for illustrating the present invention, and the scope of the present invention is not limited thereto.

Reagents and Experimental Conditions

All experiments were performed under an inert atmosphere using a standard glove box and Schlenk technique.

Toluene, hexane, and tetrahydrofuran (THF) were used after distillation from benzophenone ketyl. Methylcyclohexane (anhydrous grade) used in polymerization reaction was used after purchasing from Tokyo Chemical Industry (TCI) and purifying using a Na/K alloy. $HfCl_4$ of a sublimation grade was purchased from Streme and used as it was. An ethylene-propylene gas mixture was purified with trioctylaluminum (0.6 M in a mineral system) in a bomb reactor (2.0 L) and used.

$^1H$ NMR (600 MHz) and $^{13}C$ NMR (150 MHz) spectrums were recorded using a ECZ 600 apparatus (JOEL).

Elemental analysis was performed in the Analysis Center of Ajou University.

GPC data was analyzed in 1,2,4-trichlorobenzene at 160° C. using a PL-GPC 220 system equipped with a refractive index detector and two columns (Plarian Mixed-B 7.5×300 mm Varian [Polymer Lab]).

Preparation of Transition Metal Compound

Example 1

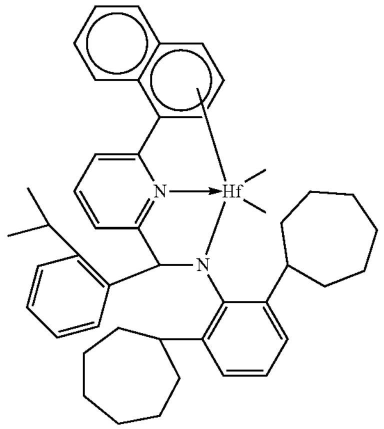

(i) Preparation of Ligand Compound

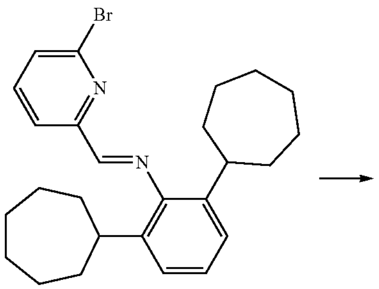

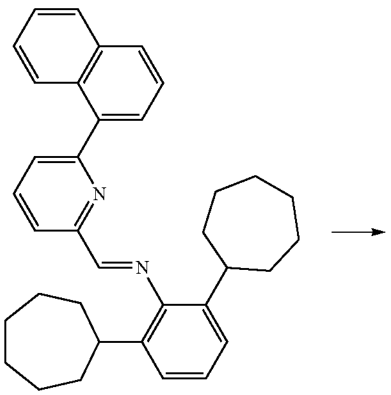

-continued

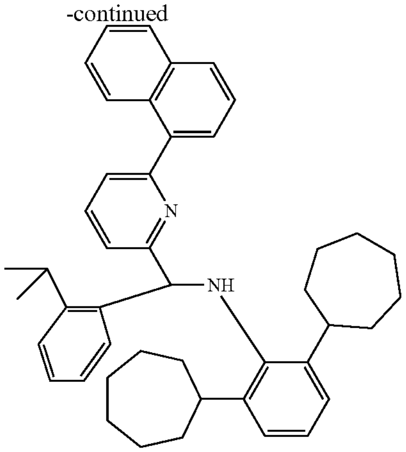

2,6-dicycloheptylaniline (1.94 g, 6.78 mmol) and 6-bromo-2-pyridinecarboxaldehyde (1.26 g, 6.78 mmol) were dissolved in toluene (8 mL), and molecular sieves were injected thereto. The mixture was heated to 70° C. overnight while stirring. After filtering, a solvent was removed in a rotary evaporator. A yellow solid was obtained (2.35 g, 77%).

$^1$H NMR ($C_6D_6$): δ 8.42 (s, 1H, NCH), 8.11 (d, J=6.6 Hz, 1H), 7.14 (m, 3H), 6.84 (d, J=8.4 Hz, 1H), 6.64 (t, J=7.2 Hz, 1H), 2.94 (m, 2H), 1.92 (m, 4H), 1.62 (m, 8H), 1.45 (m, 12H) ppm.

$^{13}$C NMR ($C_6D_6$): δ 27.79, 28.21, 36.54, 40.95, 119.38, 124.24, 125.36, 129.83, 138.79, 138.82, 142.56, 147.48, 156.00, 162.28 ppm.

HRMS (EI): m/z calcd. ([M$^+$] $C_{26}H_{33}BrN_2$) 452.1827. Found: 452.1830.

Under nitrogen, a Schlenk flask was charged with the compound (2.35 g, 5.18 mmol), 1-naphthylboronic acid (0.936 g, 5.44 mmol), $Na_2CO_3$ (1.45 g, 13.6 mmol) and toluene (10 mL). A solution of $(Ph_3P)_4Pd$ (16.2 mg, 0.0140 mmol) in a degassed $H_2O$-EtOH mixture (1:1 [v/v], 5 mL) and toluene (2 mL) was injected. A two-phase solution was heated to 70° C. overnight while stirring. After cooling to room temperature, water (15 mL) was added, and a product was extracted with toluene (3×10 mL). An organic phase collected was dried with anhydrous $MgSO_4$, and solvents were removed in a rotary evaporator. A yellow solid was obtained (2.17 g, 84%).

$^1$H NMR ($C_6D_6$): δ 8.70 (s, 1H, NCH), 8.44 (d, J=7.8 Hz, 1H), 8.35 (d, J=9.0 Hz, 1H), 7.68 (d, J=7.2 Hz, 1H), 7.65 (d, J=8.4 Hz, 1H), 7.53 (d, J=7.2 Hz, 1H), 7.28 (m, 4H), 7.18 (m, 4H), 3.11 (m, 2H), 2.00 (m, 4H), 1.66 (m, 8H), 1.52 (m, 12H) ppm.

$^{13}$C NMR ($C_6D_6$): δ 27.87, 28.23, 36.66, 40.94, 119.14, 124.22, 125.13, 125.49, 126.16, 126.27, 126.61, 126.73, 128.35, 128.74, 129.39, 131.83, 134.54, 137.18, 138.54, 139.06, 147.97, 155.11, 159.84, 164.29 ppm.

HRMS (EI): m/z calcd. ([M$^+$] $C_{36}H_{40}N_2$) 500.3191. Found: 500.3188.

2-isopropylphenyllithium (0.436 g, 3.46 mmol) dissolved in diethyl ether (8 mL) was added dropwisely to a Schlenk flask including the compound (1.00 g, 2.00 mmol) in diethyl ether (20 mL). After stirring for 3 hours, an aqueous solution (10 mL) of ammonium chloride (0.30 g) was added thereto, and a product was extracted with diethyl ether (3×10 mL). An oil produced was dried overnight at 60° C. in high vacuum. A yellow solid was obtained (0.912 g, 74%).

$^1$H NMR ($C_6D_6$): δ 8.24 (m, 1H), 7.82 (m, 1H), 7.63 (m, 1H), 7.61 (d, J=8.4 Hz, 1H), 7.56 (d, J=7.2 Hz, 1H), 7.23 (m, 8H), 7.11 (m, 4H), 5.72 (s, 1H, NCH), 4.46 (s, 1H, NH), 3.27 (septet, J=7.2 Hz, 1H, CH), 2.89 (m, 2H), 1.82 (m, 2H), 1.74 (m, 2H), 1.58 (m, 8H), 1.39 (m, 8H), 1.24 (m, 2H), 1.14 (m, 2H), 1.00 (d, J=6.6 Hz, 3H, $CH_3$), 0.98 (d, J=6.0 Hz, 3H, $CH_3$) ppm.

$^{13}$C NMR ($C_6D_6$): δ 23.60, 24.53, 27.83, 27.95, 27.98, 29.10, 37.22, 37.50, 40.34, 67.23, 119.93 122.91, 124.31, 124.59, 125.34, 125.77, 126.03, 126.53, 126.58, 126.72, 127.56, 128.53, 129.34, 131.84, 134.63, 136.97, 138.74, 142.09, 142.95, 144.24, 146.46, 159.23, 164.01 ppm.

HRMS (EI): m/z calcd. ([M$^+$] $C_{45}H_{52}N_2$) 620.4130. Found: 620.4128.

(ii) Preparation of Transition Metal Compound

A Schlenk flask was charged with the ligand compound (0.241 g, 0.388 mmol) in toluene (1.5 g), and n-BuLi (0.25 mL, a 1.6 M solution in hexane, 0.41 mmol) was added thereto dropwisely at room temperature. After stirring for 1 hour, $HfCl_4$ (0.125 g, 0.390 mmol) was added thereto as a solid. The reaction mixture was heated at 100° C. and stirred for 2 hours. After cooling, MeMgBr (0.44 mL, a 3.1 M solution in diethyl ether, 1.4 mmol) was injected, followed by stirring at room temperature overnight. A volatile material was removed via a vacuum line, and a product was extracted with toluene (12 mL). The extract was obtained through celite filtering. After removing a solvent through a vacuum line, the residue was softened in hexane (2 mL) to obtain a yellow solid (0.211 g, 66%). $^1$H NMR spectrum and $^{13}$C NMR spectrum were analyzed, and the results are shown in FIG. 1.

$^1$H NMR ($C_6D_6$): δ 8.59 (d, J=7.2 Hz, 1H), 8.34 (d, J=8.4 Hz, 1H), 7.78 (d, J=8.4 Hz, 1H), 7.69 (d, J=6.6 Hz, 1H), 7.58 (d, J=7.2 Hz, 1H), 7.47 (m, 1H), 7.32 (m, 1H), 7.27 (t, J=7.2 Hz, 1H), 7.18 (m, 1H), 7.09 (m, 5H), 6.90 (d, J=7.8 Hz, 1H), 6.64 (d, J=7.8 Hz, 1H), 6.44 (s, 1H, NCH), 3.49 (m, 1H), 3.04 (t, J=10.2 Hz, 1H), 2.89 (septet, J=7.2 Hz, 1H, CH), 2.32 (m, 1H), 2.10 (m, 2H), 1.90 (m, 1H), 1.80 (m, 1H), 1.62 (m, 10H), 1.24 (m, 6H), 1.19 (d, J=7.2 Hz, 3H, $CH_3$), 1.13 (m, 2H), 0.98 (s, 3H, $HfCH_3$), 0.79 (d, J=6.6 Hz, 3H, $CH_3$), 0.69 (s, 3H, $HfCH_3$), 0.56 (m, 1H) ppm.

$^{13}$C NMR ($C_6D_6$): δ 23.17, 25.27, 27.17, 27.45, 27.50, 27.62, 28.15, 28.37, 28.89, 28.93, 29.20, 37.01, 38.22, 39.24, 39.57, 40.30, 41.05, 62.44, 66.71, 77.22, 119.61, 120.23, 124.18, 125.30, 125.43, 125.51, 126.04, 126.97, 127.14, 129.94, 130.04, 130.20, 130.85, 134.31, 135.81, 140.70, 141.02, 143.95, 144.35, 146.27, 147.83, 148.19, 164.39, 171.96, 206.43 ppm.

Anal. calcd. ($C_{47}H_{56}HfN_2$): C, 68.22; H, 6.82; N, 3.39%. Found: C, 68.44; H, 6.95; N, 3.07%.

Example 2

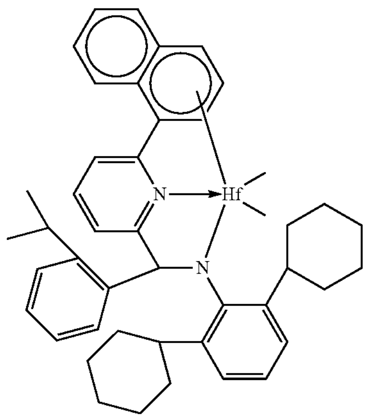

(i) Preparation of Ligand Compound

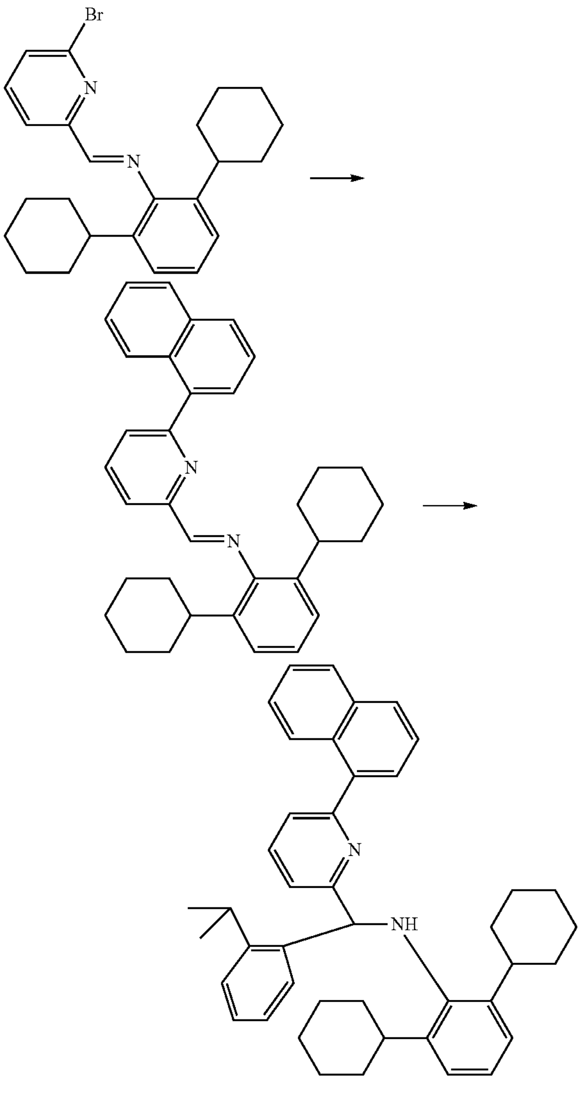

Preparation was performed by the same method as in Example 1 using 2,6-dicyclohexylaniline (0.772 g, 3.00 mmol), 6-bromo-2-pyridinecarboxaldehyde (0.558 g, 3.00 mmol) and toluene (5 mL). A yellow solid was obtained (1.07 g, 84%).

$^1$H NMR ($C_6D_6$): δ 8.41 (s, 1H, NCH), 8.09 (d, J=7.8 Hz, 1H), 7.53 (m, 3H), 6.85 (d, J=7.8 Hz, 1H), 6.63 (t, J=7.8 Hz, 1H), 2.74 (m, 2H), 1.87 (d, J=12 Hz, 4H), 1.64 (d, J=12.6 Hz, 4H), 1.54 (d, J=10.8 Hz, 2H), 1.39 (quartet, J=10.2 Hz, 4H), 1.11 (m, 6H) ppm.

$^{13}$C NMR ($C_6D_6$): δ 26.55, 27.33, 34.25, 39.30, 119.42, 124.32, 125.21, 129.83, 136.68, 138.82, 142.54, 148.94, 155.95, 162.06 ppm.

HRMS (EI): m/z calcd ([$M^+$] $C_{24}H_{29}BrN_2$) 424.1514. Found: 424.1516.

Preparation was performed by the same method as in Example 1 using the compound (1.07 g, 2.51 mmol), 1-naphthylboronic acid (0.453 g, 2.64 mmol), $Na_2CO_3$ (0.700 g, 6.60 mmol), toluene (5 mL), degassed $H_2O$/EtOH (1 mL, v/v, 1:1), and $(Ph_3P)_4Pd$(7.83 mg, 0.00678 mmol) in toluene (1 mL). By column chromatography on silica gel using hexane and ethyl acetate containing a small amount of triethylamine (v/v, 90:3:1), a lemon yellow oil (0.712 g, 60%) was obtained.

$^1$H NMR ($C_6D_6$): δ 8.70 (s, 1H, NCH), 8.41 (d, J=7.8 Hz, 1H), 8.31 (d, J=7.8 Hz, 1H), 7.68 (d, J=7.2 Hz, 1H), 7.65 (d, J=7.8 Hz, 1H), 7.54 (d, J=7.2 Hz, 1H), 7.27 (m, 4H), 7.20 (m, 4H), 2.93 (m, 2H), 1.90 (d, J=12 Hz, 4H), 1.61 (d, J=13.2 Hz, 4H), 1.50 (d, J=12.6 Hz, 2H), 1.38 (m, 4H), 1.11 (m, 6H), ppm.

$^{13}$C NMR ($C_6D_6$): δ 26.63, 27.38, 34.35, 39.36, 119.21, 124.32, 124.98, 125.50, 126.15, 126.21, 126.64, 126.75, 128.15, 128.73, 129.38, 131.81, 134.52, 136.94, 137.14, 138.52, 149.48, 155.13, 159.79, 164.05 ppm.

HRMS (EI): m/z calcd ([$M^+$] $C_{34}H_{36}N_2$) 472.2878. Found: 472.2878.

Preparation was performed by the same method as in Example 1 using the compound (0.247, 0.523 mmol) and 2-isopropylphenyllithium (0.114 g, 0.904 mmol). A yellow solid was obtained (0.257 g, 83%).

$^1$H NMR ($C_6D_6$): δ 8.24 (m, 1H), 7.90 (m, 1H), 7.64 (m, 1H), 7.62 (d, J=7.8 Hz, 1H), 7.56 (d, J=7.2 Hz, 1H), 7.26 (m, 3H), 7.22 (m, 4H), 7.11 (m, 5H), 5.62 (d, J=5.4 Hz, 1H, NCH), 4.59 (d, J=5.4 Hz, 1H, NH), 3.31 (septet, J=7.2 Hz, 1H, CH), 2.74 (m, 2H), 1.79 (d, J=7.8 Hz, 2H), 1.64 (m, 4H), 1.54 (m, 4H), 1.32 (m, 4H), 1.08 (m, 2H), 1.03 (d, J=6.6 Hz, 3H, $CH_3$), 1.00 (m, 1H), 0.980 (d, J=6.6 Hz, 3H, $CH_3$), 0.921 (m, 3H) ppm.

$^{13}$C NMR ($C_6D_6$): δ 23.78, 24.45, 26.63, 27.42, 27.54, 28.96, 34.77, 35.08, 39.01, 67.64, 119.99, 122.89, 124.13, 124.80, 125.36, 125.77, 126.08, 126.46, 126.56, 126.71, 127.58, 128.55, 129.35, 131.84, 134.64, 136.94, 138.77, 141.88, 142.24, 144.97, 146.32, 159.28, 163.74 ppm.

HRMS (EI): m/z calcd ([$M^+$] $C_{43}H_{48}N_2$) 592.3817. Found: 592.3819.

(ii) Preparation of Transition Metal Compound

Figure 2:
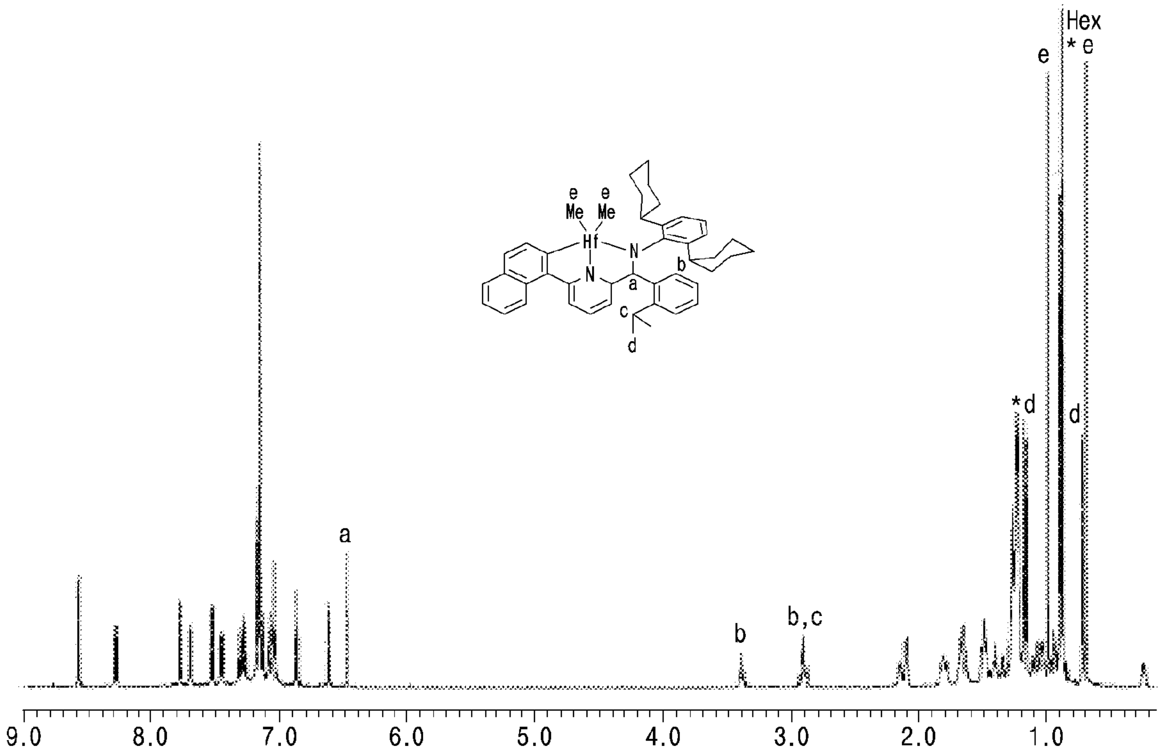
FIG. 2 shows a $^1H$ NMR spectrum and a $^{13}C$ NMR spectrum of Example 2.
Figure 2:
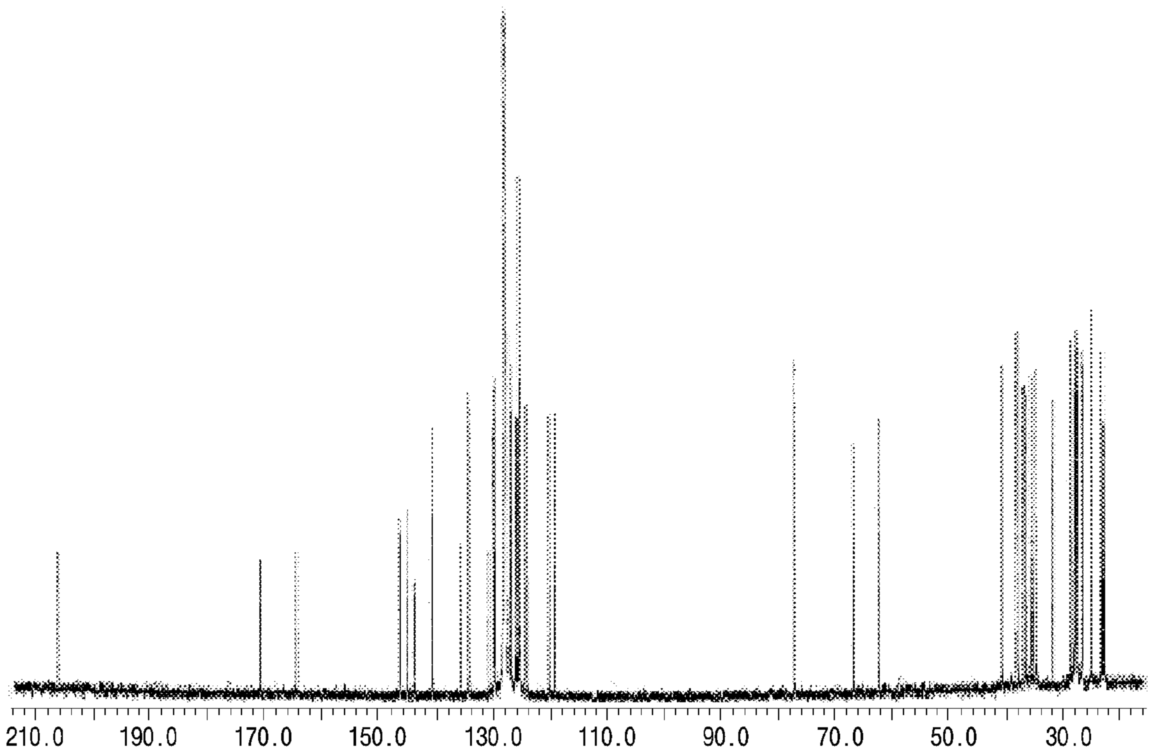
Figure 3:
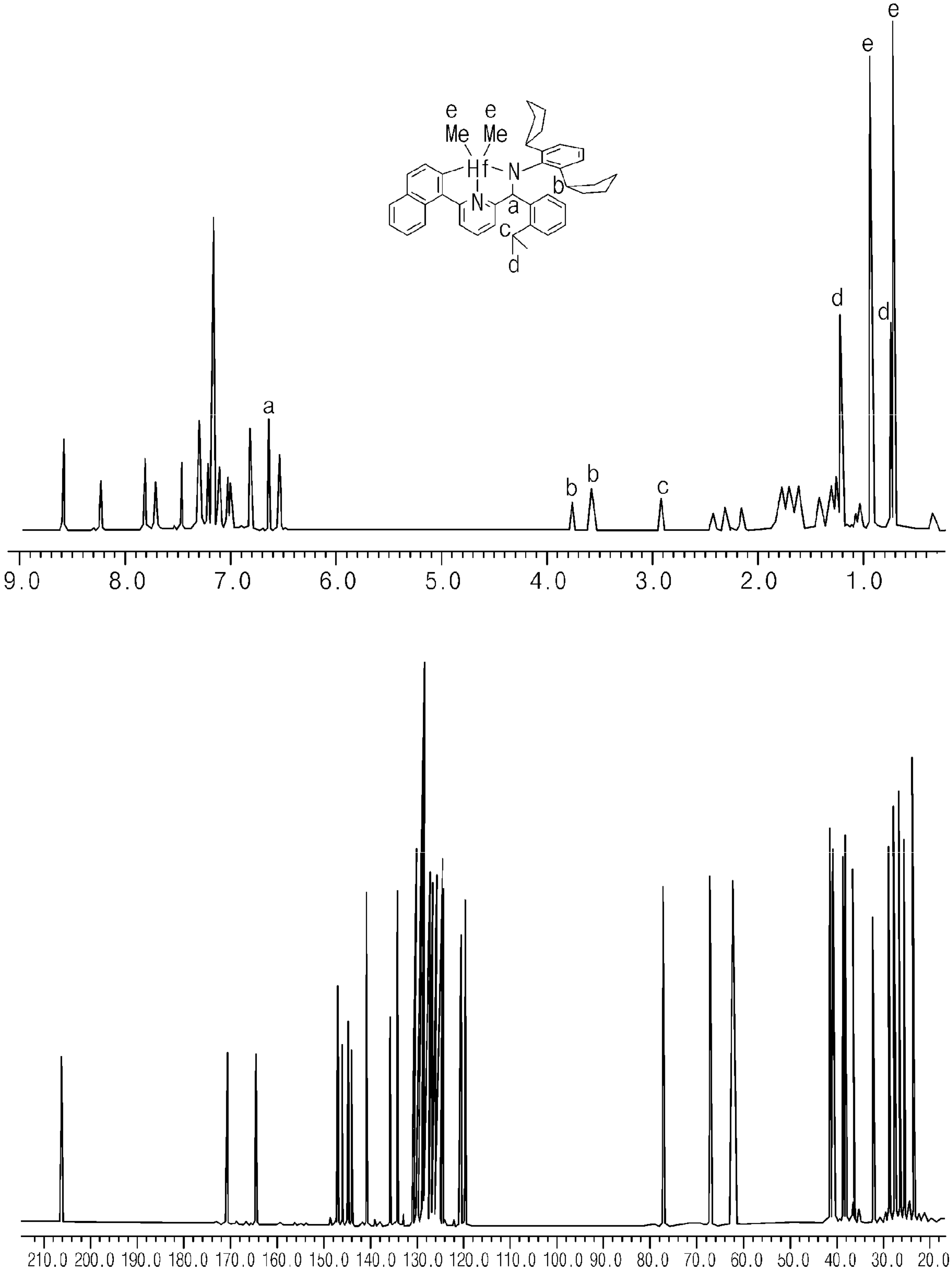
FIG. 3 shows a $^1H$ NMR spectrum and a $^{13}C$ NMR spectrum of Example 3.
Figure 4:
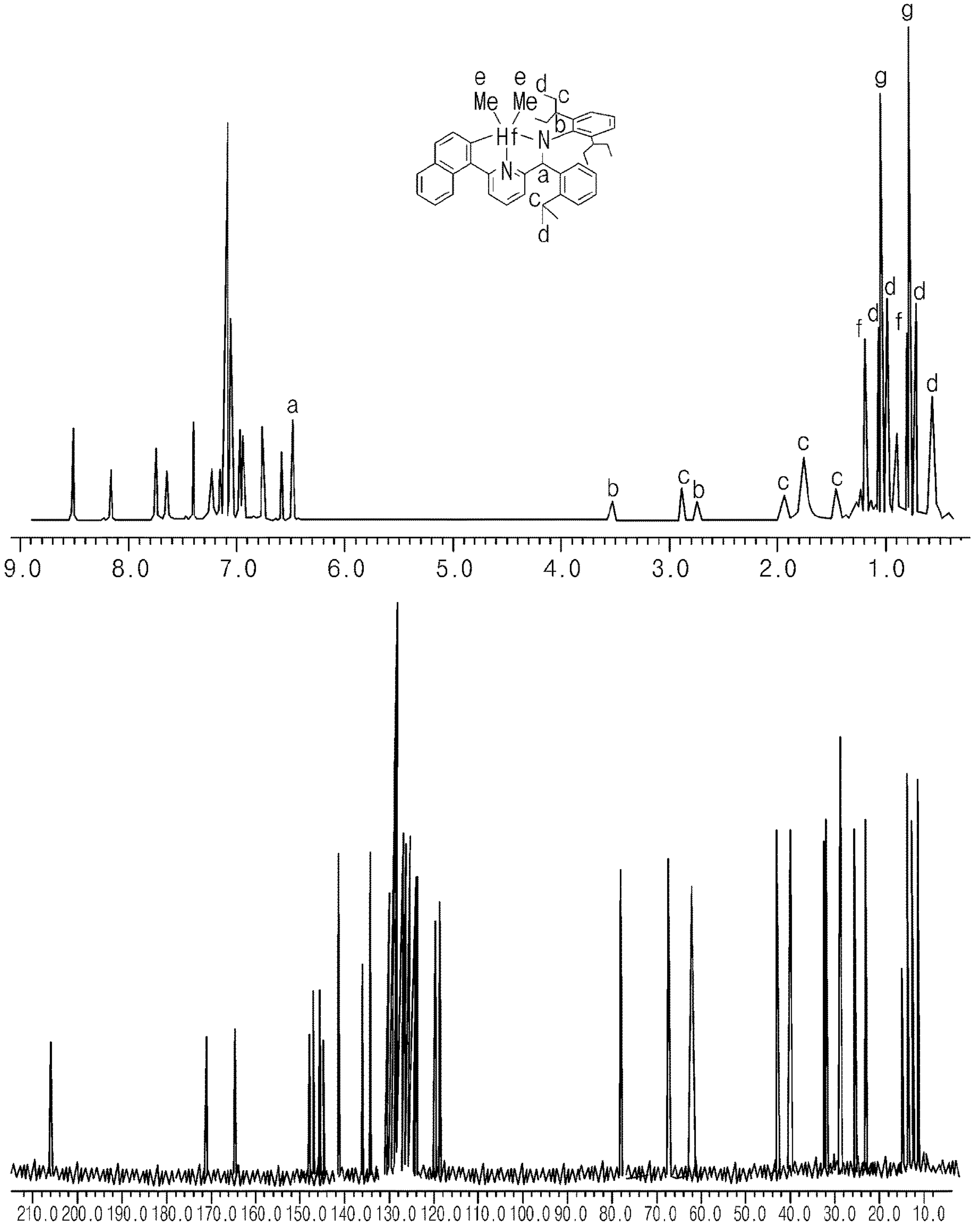
FIG. 4 shows a $^1H$ NMR spectrum and a $^{13}C$ NMR spectrum of Example 4.
Figure 5:
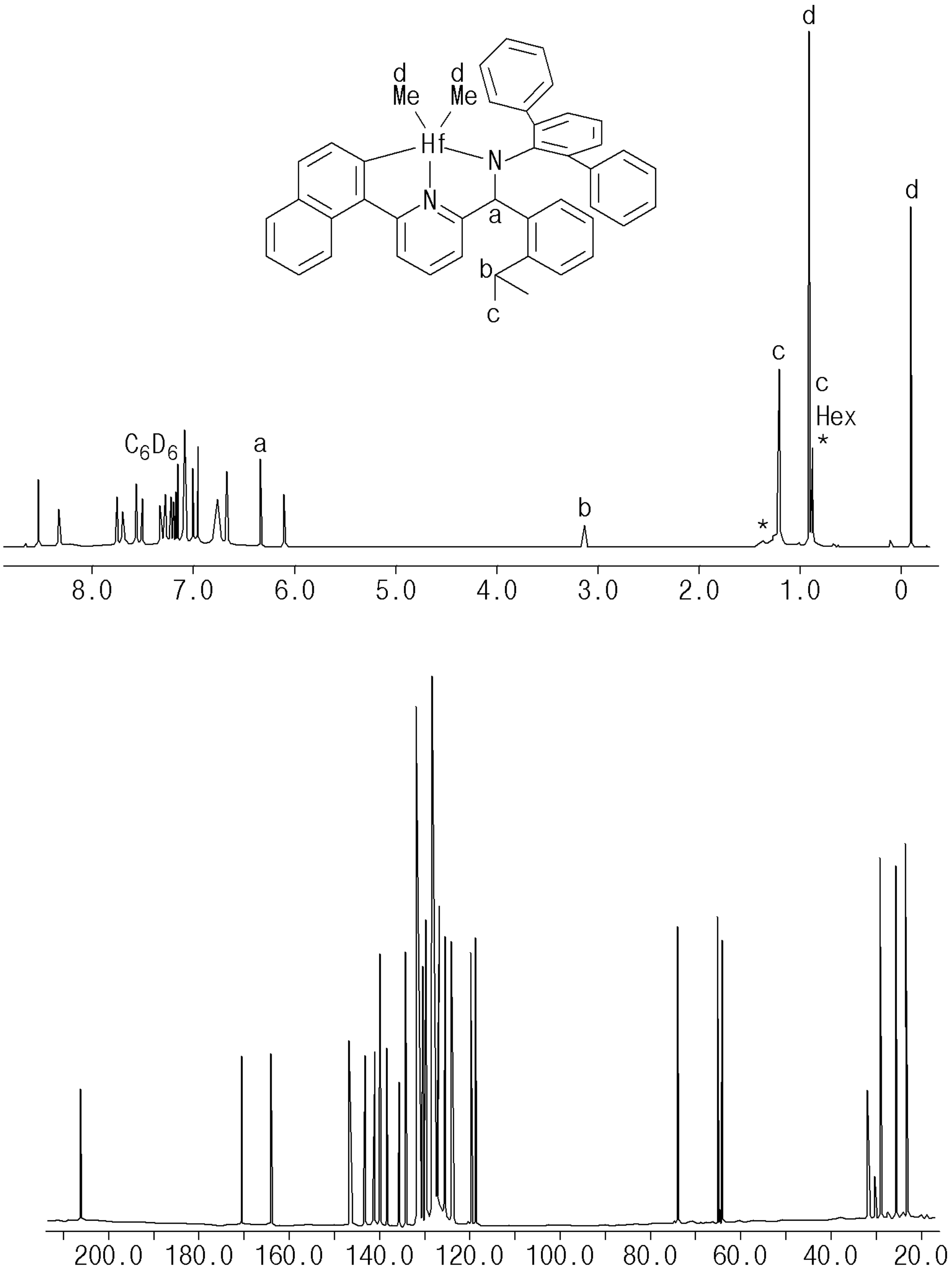
FIG. 5 shows a $^1H$ NMR spectrum and a $^{13}C$ NMR spectrum of Example 5.
Figure 6:
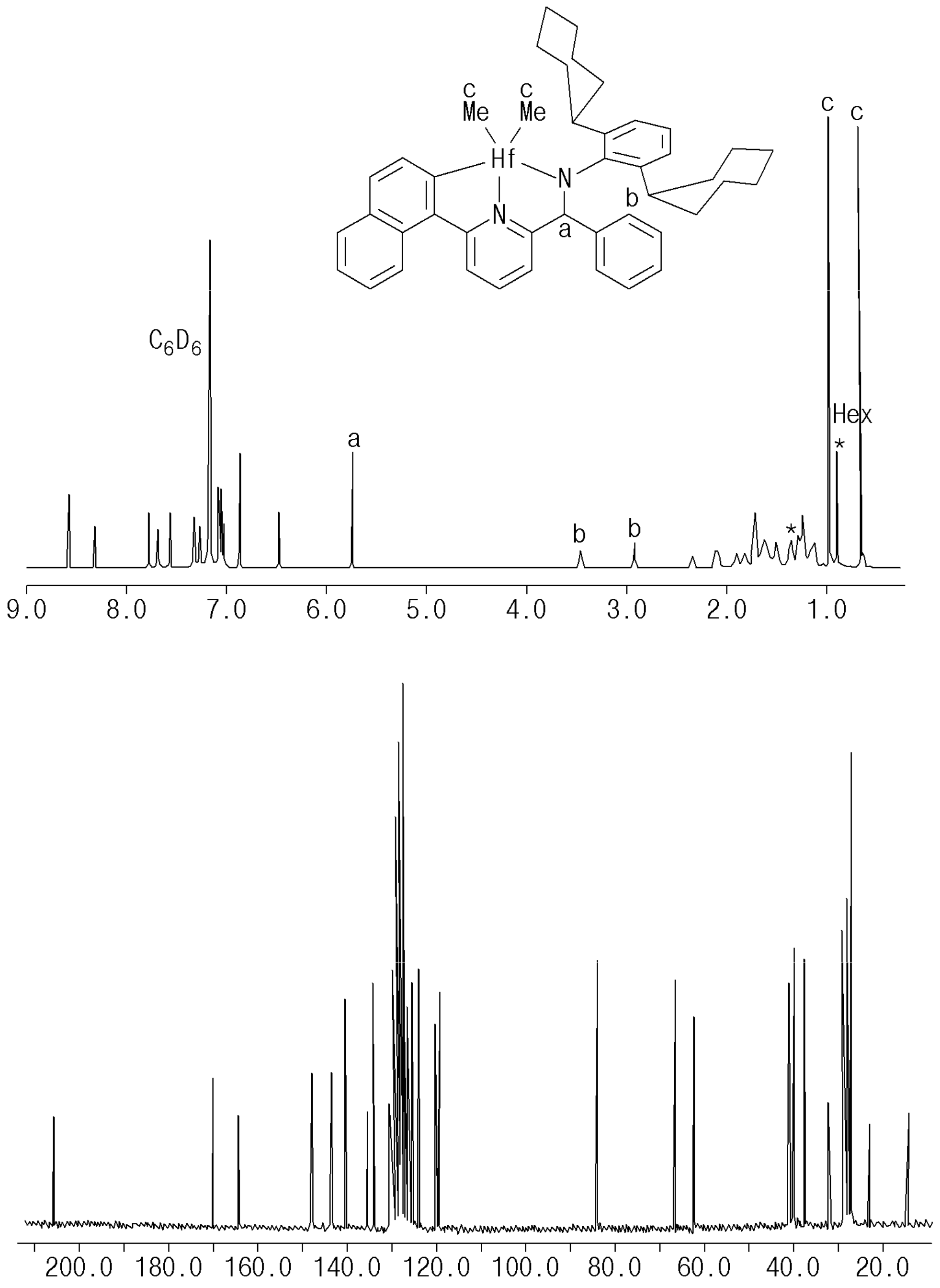
FIG. 6 shows a $^1H$ NMR spectrum and a $^{13}C$ NMR spectrum of Example 6.
Figure 7:
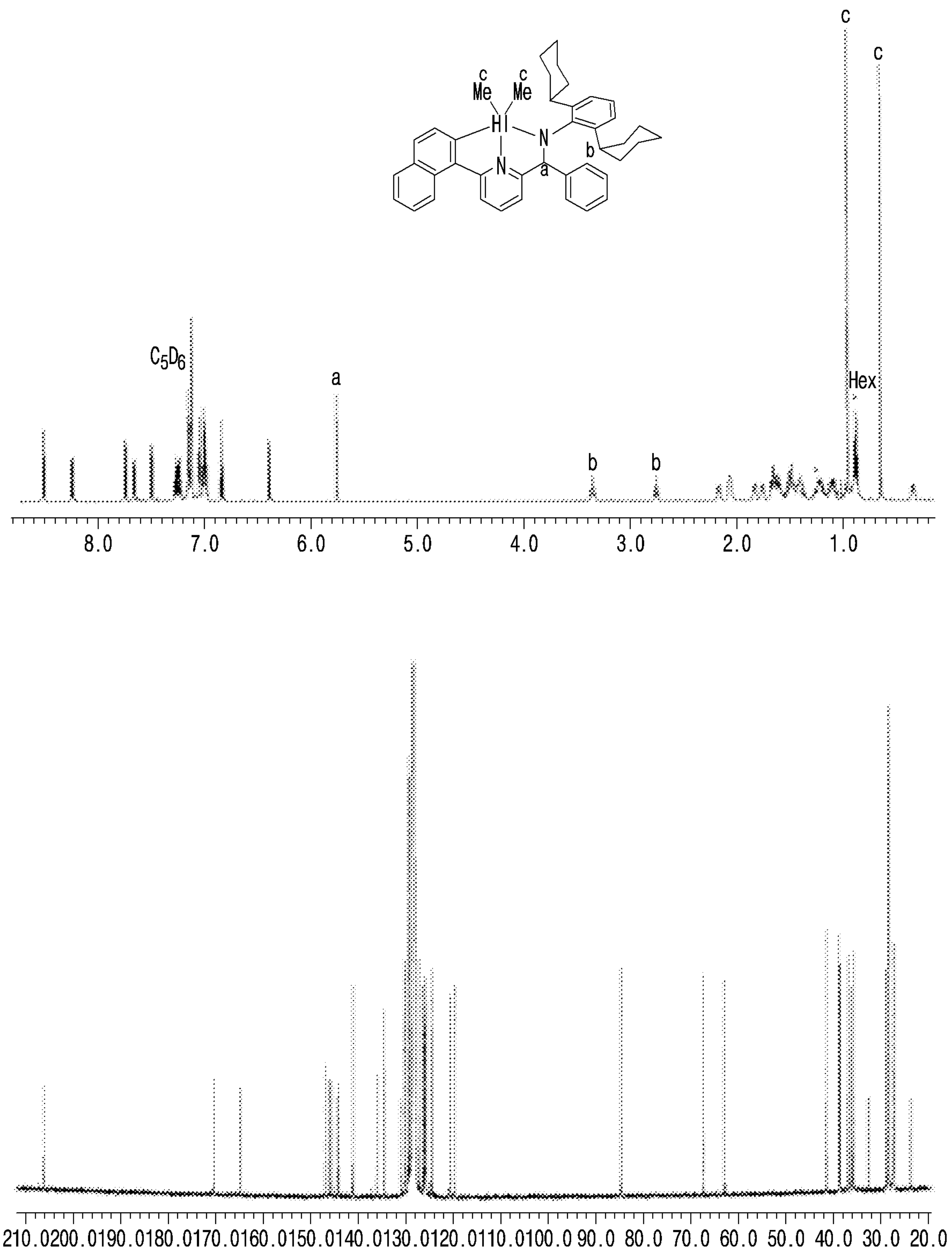
FIG. 7 shows a $^1H$ NMR spectrum and a $^{13}C$ NMR spectrum of Example 7.
Figure 8:
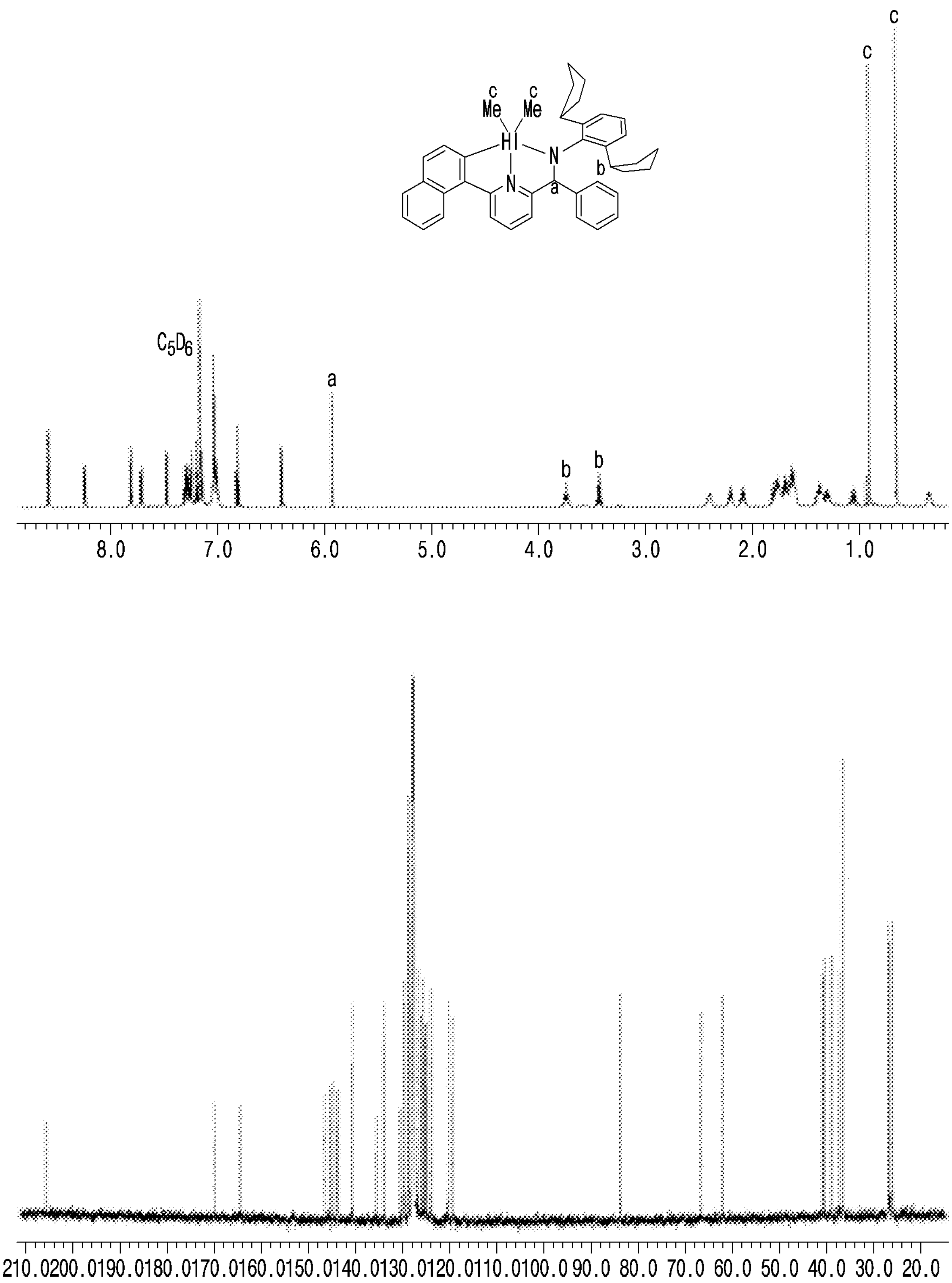
FIG. 8 shows a $^1H$ NMR spectrum and a $^{13}C$ NMR spectrum of Example 8.

Preparation was performed by the same method as in Example 1 using the ligand compound (0.150 g, 0.253 mmol), n-BuLi (0.17 mL, a 1.6 M solution in hexane, 0.27 mmol), $HfCl_4$ (0.0814 g, 0.254 mmol), MeMgBr (0.29 mL, a 3.1 M solution in diethyl ether, 0.89 mmol) and toluene (1.5 g). A yellow solid was obtained (0.128 g, 63%). $^1$H NMR spectrum and $^{13}$C NMR spectrum were analyzed, and the results are shown in FIG. 2.

$^1$H NMR ($C_6D_6$): δ 8.58 (d, J=7.8 Hz, 1H), 8.29 (d, J=8.4 Hz, 1H), 7.79 (d, J=7.8 Hz, 1H), 7.71 (d, J=7.2 Hz, 1H), 7.54 (d, J=7.8 Hz, 1H), 7.46 (m, 1H), 7.30 (m, 2H), 7.15 (m, 3H), 7.09 (m, 3H), 6.88 (t, J=7.8 Hz, 1H), 6.62 (d, J=8.4 Hz, 1H), 6.48 (s, 1H, NCH), 3.39 (m, 1H), 2.92 (m, 2H), 2.15 (d, J=13.8 Hz, 1H), 2.10 (d, J=13.8 Hz, 2H), 1.80 (m, 2H), 1.65 (m, 3H), 1.29 (m, 6H), 1.17 (d, J=7.2 Hz, 3H, $CH_3$), 1.07 (m, 3H), 0.99 (s, 3H, $HfCH_3$), 0.95 (m, 2H), 0.73 (d, J=7.2 Hz, 3H, $CH_3$), 0.70 (s, 3H, $HfCH_3$), 0.23 (m, 1H) ppm.

$^{13}$C NMR ($C_6D_6$): δ 23.31, 25.04, 26.63, 26.74, 27.70, 27.76, 27.81, 28.29, 28.89, 35.00, 35.66, 36.62, 37.02, 38.13, 40.88, 62.53, 67.00, 77.27, 119.30, 120.30, 124.29, 125.52, 125.60, 125.97, 126.95, 127.06, 127.73, 129.91, 130.00, 130.09, 130.85, 134.36, 135.80, 140.73, 140.89, 144.02, 145.12, 146.31, 146.38, 146.49, 164.46, 170.79, 206.40 ppm.

Anal. calcd. ($C_{45}H_{52}HfN_2$): C, 67.61; H, 6.56; N, 3.50%. Found: C, 67.98; H, 6.88; N, 3.19%.

Example 3

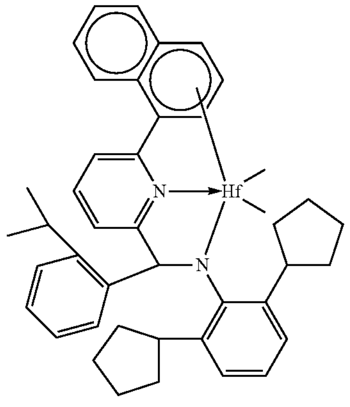

(i) Preparation of Ligand Compound

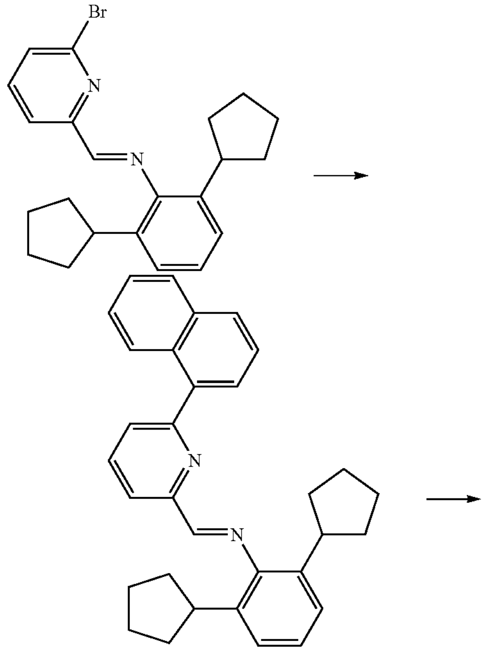

-continued

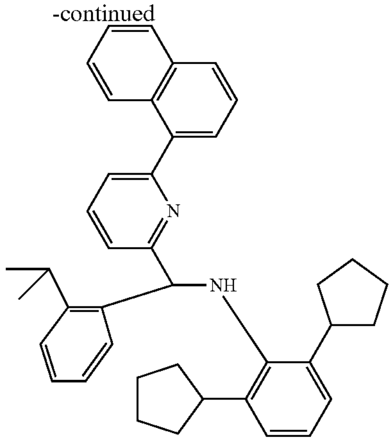

Preparation was performed by the same method as in Example 1 using 2,6-dicyclopentylaniline (1.69 g, 7.36 mmol), 6-bromo-2-pyridinecarboxaldehyde (1.37 g, 7.36 mmol) and toluene (12 mL). A yellow solid was obtained (1.07 g, 84%). Through recrystallization in hexane and toluene at −30° C., an analytically pure compound was obtained.

$^1$H NMR ($C_6D_6$): δ 8.36 (s, 1H, NCH), 8.03 (d, J=7.8 Hz, 1H), 7.13 (m, 3H), 6.84 (d, J=7.8 Hz, 1H), 6.60 (t, J=7.2 Hz, 1H), 3.13 (m, 2H), 1.91 (m, 4H), 1.59 (m, 8H), 1.40 (m, 4H) ppm. $^{13}$C NMR ($C_6D_6$): δ 26.05, 34.72, 40.82, 119.55, 124.11, 125.21, 129.78, 135.28, 138.79, 142.45, 150.38, 155.90, 162.32 ppm.

HRMS (EI): m/z calcd ([M$^+$] $C_{22}H_{25}BrN_2$) 396.1201. Found: 396.1203.

Preparation was performed by the same method as in Example 1 using the compound (1.63 g, 4.09 mmol), 1-naphthylboronic acid (0.739 g, 4.30 mmol), $Na_2CO_3$ (1.14 g, 10.8 mmol), toluene (8 mL), degassed $H_2O$/EtOH (3.5 mL, v/v, 1:1), and a solution of $(Ph_3P)_4Pd$ (12.8 mg, 0.0111 mmol) in toluene (1 mL). Through recrystallization in hexane and toluene at −30° C., an analytically pure compound was obtained. A yellow solid was obtained (1.24 g, 68%).

$^1$H NMR ($C_6D_6$): δ 8.66 (s, 1H, NCH), 8.39 (d, J=7.2 Hz, 1H), 8.28 (m, 1H), 7.68 (m, 1H), 7.65 (d, J=8.4 Hz, 1H), 7.56 (d, J=7.2 Hz, 1H), 7.24 (m, 6H), 7.17 (s, 1H), 7.14 (d, J=8.4 Hz, 1H), 3.30 (quintet, d, J=7.2 Hz, 2H), 2.00 (m, 4H), 1.64 (m, 8H), 1.44 (m, 4H) ppm.

$^{13}$C NMR ($C_6D_6$): δ 26.07, 34.78, 40.94, 119.31, 124.12, 124.98, 125.53, 126.16, 126.18, 126.65, 126.77, 128.74, 129.38, 131.79, 134.51, 135.47, 137.07, 138.57, 150.98, 155.14, 159.73, 164.32 ppm.

HRMS (EI): m/z calcd ([M$^+$] $C_{32}H_{32}N_2$) 444.2565. Found: 444.2561.

Preparation was performed by the same method as in Example 1 using the compound (1.20, 2.70 mmol) and 2-isopropylphenyllithium (0.589 g, 4.66 mmol). A lemon yellow solid was obtained (1.38 g, 91%).

$^1$H NMR ($C_6D_6$): δ 8.22 (m, 1H), 7.77 (d, J=8.4 Hz, 1H), 7.65 (m, 1H), 7.61 (d, J=8.4 Hz, 1H), 7.53 (d, J=7.2 Hz, 1H), 7.27 (m, 3H), 7.19 (m, 1H), 7.13 (m, 6H), 7.07 (d, J=7.8 Hz, 1H), 7.03 (d, J=7.2 Hz, 1H), 5.74 (s, 1H, NCH), 4.95 (s, 1H, NH), 3.34 (septet, J=7.2 Hz, 1H, CH), 3.26 (m, 2H), 1.87 (m, 2H), 1.71 (m, 2H), 1.61 (m, 4H), 1.48 (m, 4H), 1.32 (m, 4H), 1.03 (d, J=6.6 Hz, 3H, $CH_3$), 0.981 (d, J=6.6 Hz, 3H, $CH_3$) ppm.

$^{13}$C N-MR ($C_6D_6$): δ 23.83, 24.39, 26.06 26.08, 28.94, 35.54, 35.62, 40.58, 67.19, 120.19, 122.87, 124.25, 124.69, 125.39, 125.89, 126.10, 126.30, 126.58, 126.60, 127.65, 128.59, 128.63, 129.31, 131.86, 134.60, 136.86, 138.87, 140.76, 141.40, 145.93, 146.72, 159.08, 163.23 ppm.

HRMS (EI): m/z calcd ([M$^+$] $C_{41}H_{44}N_2$) 564.3504. Found: 564.3507.

(ii) Preparation of Transition Metal Compound

Preparation was performed by the same method as in Example 1 using the ligand compound (0.300 g, 0.531 mmol), n-BuLi (0.348 mL, a 1.6 M solution in hexane, 0.560 mmol), $HfCl_4$ (0.171 g, 0.533 mmol), MeMgBr (0.60 mL, a 3.1 M solution in diethyl ether, 1.9 mmol) and toluene (3.0 g). A yellow solid was obtained (0.278 g, 68%).

$^1$H NMR ($C_6D_6$): δ 8.59 (d, J=7.8 Hz, 1H), 8.24 (d, J=8.4 Hz, 1H), 7.81 (d, J=7.2 Hz, 1H), 7.71 (d, J=7.8 Hz, 1H), 7.47 (d, J=8.4 Hz, 1H), 7.30 (m, 3H), 7.21 (m, 2H), 7.11 (m, 2H), 7.01 (m, 2H), 6.80 (t, J=7.8 Hz, 1H), 6.62 (s, 1H, NCH), 6.52 (d, J=7.8 Hz, 1H), 3.74 (m, 1H), 3.55 (quintet, J=8.4 Hz, 1H), 2.90 (septet, J=6.6 Hz, 1H, CH), 2.38 (m, 1H), 2.28 (m, 1H), 2.13 (m, 1H), 1.69 (m, 8H), 1.29 (m, 3H), 1.19 (d, J=7.2 Hz, 3H, $CH_3$), 1.04 (m, 1H), 0.92 (s, 3H, $HfCH_3$), 0.72 (d, J=6.6 Hz, 3H, $CH_3$), 0.70 (s, 3H, $HfCH_3$), 0.29 (m, 1H) ppm.

$^{13}$C NMR ($C_6D_6$): δ 23.22, 25.23, 26.23, 26.31, 27.15, 27.45, 28.66, 36.27, 37.46, 38.06, 38.54, 40.40, 41.01, 62.13, 66.83, 119.52, 120.37, 124.24, 125.09, 125.26, 125.51, 125.61, 125.86, 126.17, 126.50, 126.63, 126.95, 129.88, 129.97, 130.00, 130.78, 134.11, 134.30, 135.73, 140.79, 140.87, 144.06, 144.80, 145.93, 146.96, 146.99, 164.46, 170.79, 206.11 ppm.

Anal. calcd. ($C_{43}H_{48}HfN_2$): C, 66.96; H, 6.27; N, 3.63%. Found: C, 67.12; H, 6.59; N, 3.42%.

Example 4

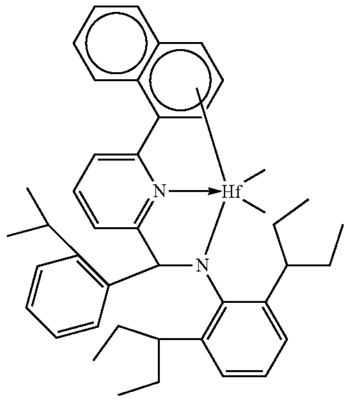

(i) Preparation of Ligand Compound

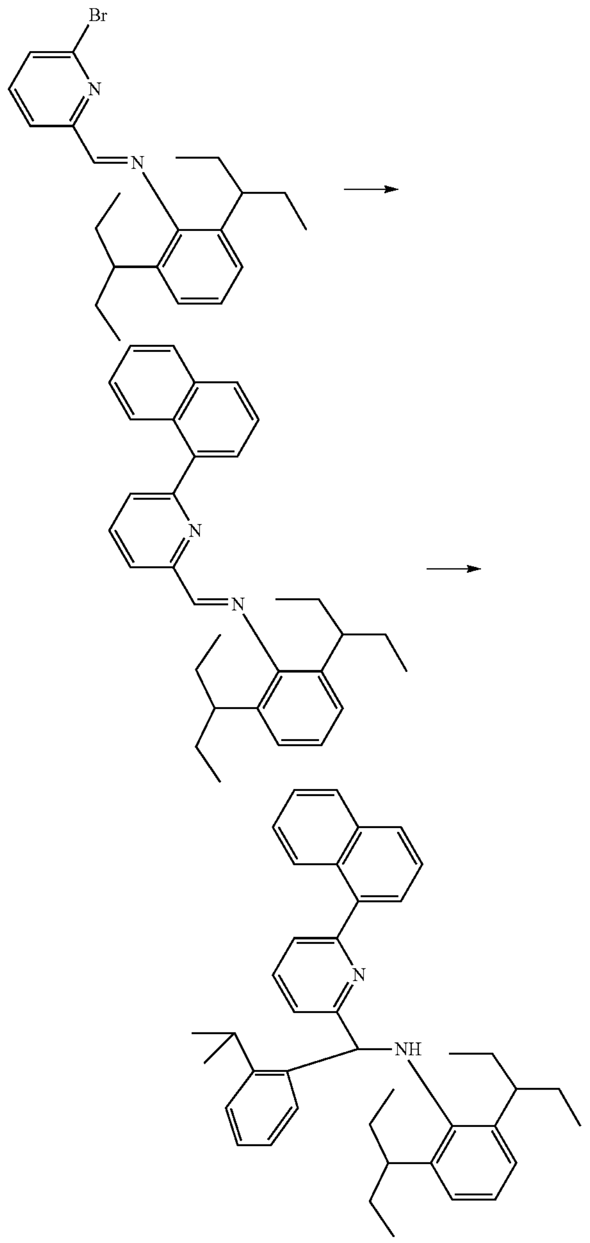

Preparation was performed by the same method as in Example 1 using 2,6-di(3-pentyl)aniline (2.2 g, 9.42 mmol), 6-bromo-2-pyridinecarboxaldehyde (1.75 g, 9.42 mmol) and toluene (15 mL). A yellow solid was obtained (3.30 g, 87%).

$^1$H NMR ($C_6D_6$): δ 8.42 (s, 1H, NCH), 8.03 (d, J=7.2 Hz, 1H), 7.11 (m, 1H), 7.03 (d, J=7.8 Hz, 2H), 6.89 (d, J=8.4 Hz, 1H), 6.66 (t, J=8.4 Hz, 1H), 2.66 (quintet, J=7.8 Hz, 2H), 1.54 (quintet, J=7.2 Hz, 8H, $CH_2$), 0.80 (t, J=7.2 Hz, 12H, $OH_3$) ppm.

$^{13}$C NMR ($C_6D_6$): δ 12.37, 29.61, 42.74, 119.42, 124.35, 125.20, 129.79, 134.12, 138.81, 142.50, 151.86, 155.93, 162.63 ppm.

HRMS (EI): m/z calcd ([$M^+$] $C_{22}H_{29}BrN_2$) 400.1514. Found: 400.1512.

Preparation was performed by the same method as in Example 1 using the compound (1.06 g, 2.63 mmol), 1-naphthylboronic acid (0.475 g, 2.76 mmol), $Na_2CO_3$ (0.733 g, 6.92 mmol), toluene (5 mL), degassed $H_2O$/EtOH (2.3 mL, v/v, 1:1), and a solution of $(Ph_3P)_4Pd$ (8.21 mg, 0.0711 mmol) in toluene (1 mL). A yellow solid was obtained (1.00 g, 85%).

$^1$H NMR ($C_6D_6$): δ 8.71 (s, 1H, NCH), 8.37 (d, J=7.2 Hz, 1H), 8.31 (m, 1H), 7.67 (t, J=4.2 Hz, 1H), 7.65 (d, J=8.4 Hz, 1H), 7.58 (d, J=7.2 Hz, 1H), 7.28 (m, 4H), 7.21 (d, J=7.8 Hz, 1H), 7.14 (d, J=7.2 Hz, 1H), 7.07 (d, J=7.8 Hz, 2H), 2.84 (quintet, J=6.6 Hz, 2H, CH), 1.60 (quintet, J=7.8 Hz, 8H, $CH_2$), 0.867 (t, J=7.2 Hz, 12H, $CH_3$) ppm.

$^{13}$C NMR ($C_6D_6$): δ 12.44, 29.69, 42.80, 119.18, 124.33, 124.96, 125.53, 126.17, 126.66, 126.75, 128.21, 128.73, 129.37, 131.79, 134.34, 134.51, 137.05, 138.58, 152.45, 155.10, 159.75, 164.66 ppm.

HRMS (EI): m/z calcd ([$M^+$] $C_{32}H_{36}N_2$) 448.2878. Found: 448.2881.

Preparation was performed by the same method as in Example 1 using the compound (0.763 g, 1.70 mmol) and 2-isopropylphenyllithium (0.371 g, 2.94 mmol). A lemon yellow solid was obtained (0.878 g, 91%).

$^1$H NMR ($C_6D_6$): δ 8.28 (m, 1H), 7.70 (d, J=7.8 Hz, 1H), 7.64 (m, 1H), 7.61 (d, J=8.4 Hz, 1H), 7.52 (d, J=7.8 Hz, 1H), 7.27 (m, 3H), 7.18 (m, 4H), 7.11 (m, 3H), 7.01 (d, J=7.8 Hz, 2H), 5.72 (d, J=7.8 Hz, 1H, NCH), 4.83 (d, J=7.8 Hz, 1H, NH), 3.37 (septet, J=6.6 Hz, 1H, CH), 2.81 (m, 2H), 1.60 (d, J=7.2 Hz, 2H, $CH_2$), 1.54 (d, J=7.2 Hz, 2H, $CH_2$), 1.41 (d, J=7.2 Hz, 2H, $CH_2$), 1.32 (d, J=7.2 Hz, 2H, $CH_2$), 1.01 (d, J=6.6 Hz, 3H, $CH_3$), 0.940 (d, J=6.6 Hz, 3H, $CH_3$), 0.793 (t, J=6.6 Hz, 6H, $CH_3$), 0.700 (t, J=6.6 Hz, 6H, $CH_3$) ppm.

$^{13}$C NMR ($C_6D_6$): δ 12.22, 12.41, 23.80, 24.42, 28.98, 29.41, 29.72, 42.01, 67.19, 120.14, 122.83, 124.31, 125.32, 126.04, 126.42, 126.59, 126.72, 127.67, 128.55, 128.74, 129.36, 131.89, 134.63, 136.96, 138.74, 140.66, 141.51, 146.78, 146.85, 159.04, 163.40 ppm.

HRMS (EI): m/z calcd ([$M^+$] $C_{41}H_{48}N_2$) 568.3817. Found: 568.3820.

(ii) Preparation of Transition Metal Compound

Preparation was performed by the same method as in Example 1 using the ligand compound (0.205 g, 0.361 mmol), n-BuLi (0.24 mL, a 1.6 M solution in hexane, 0.38 mmol), $HfCl_4$ (0.116 g, 0.362 mmol), MeMgBr (0.41 mL, a 3.1 M solution in diethyl ether, 1.3 mmol) and toluene (2.0 g). A dark yellow solid was obtained (0.167 g, 60%).

$^1$H NMR ($C_6D_6$): δ 8.61 (d, J=7.8 Hz, 1H), 8.28 (d, J=8.4 Hz, 1H), 7.81 (d, J=7.8 Hz, 1H), 7.72 (d, J=8.4 Hz, 1H), 7.50 (m, 2H), 7.31 (m, 2H), 7.12 (m, 3H), 7.05 (m, 3H), 6.84 (t, J=7.8 Hz, 1H), 6.62 (d, J=8.4 Hz, 1H), 6.53 (s, 1H, NCH), 3.55 (m, 1H, CH), 2.92 (septet, J=7.2 Hz, 1H, CH), 2.76 (m, 1H, CH), 1.94 (m, 1H), 1.77 (m, 5H), 1.48 (m, 1H), 1.18 (d, J=6.6 Hz, 3H, $CH_3$), 1.05 (t, J=7.8 Hz, 3H, $CH_3$), 1.02 (s, 3H, $HfCH_3$), 0.98 (t, J=7.2 Hz, 3H, $CH_3$), 0.80 (m, 6H, $HfCH_3$, $CH_3$), 0.73 (t, J=7.8 Hz, 3H, $CH_3$), 0.56 (m, 4H) ppm.

$^{13}$C NMR ($C_6D_6$): δ 11.31, 12.37, 13.39, 13.58, 23.35, 25.33, 27.89, 28.25, 28.77, 31.11, 39.90, 43.27, 63.34, 67.51, 77.52, 119.33, 120.26, 124.25, 124.95, 125.49, 125.53, 125.67, 125.79, 126.93, 127.02, 129.92, 129.99, 130.18, 130.78, 134.48, 135.74, 140.77, 141.35, 143.89, 144.80, 144.89, 146.21, 147.87, 164.29, 170.75, 205.95 ppm.

Anal. calcd. ($C_{43}H_{52}HfN_2$): C, 66.61; H, 6.76; N, 3.61%. Found: C, 66.54; H, 6.88; N, 3.80%.

Example 5

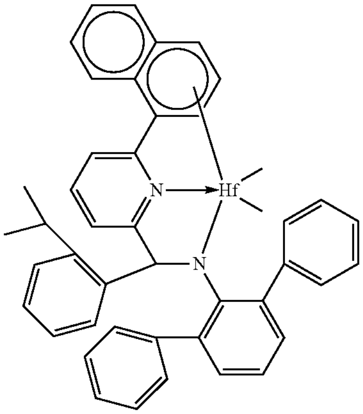

(i) Preparation of Ligand Compound

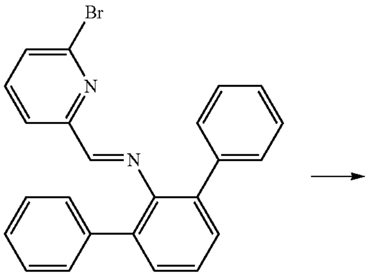

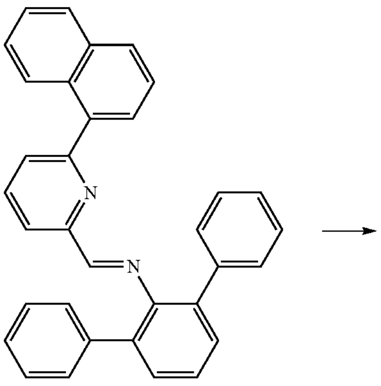

-continued

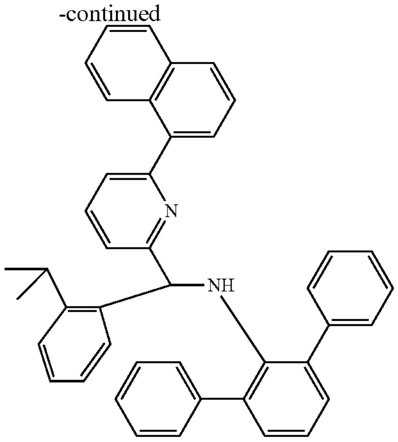

Preparation was performed by the same method as in Example 1 using 2,6-diphenylaniline (2.00 g, 8.15 mmol), 6-bromo-2-pyridinecarboxaldehyde (1.52 g, 8.15 mmol) and toluene (10 mL).

$^1$H NMR ($C_6D_6$): δ 8.09 (s, 1H, NCH), 7.63 (d, J=7.8 Hz, 1H), 7.38 (d, J=7.2 Hz, 4H), 7.29 (d, J=7.8 Hz, 2H), 7.07 (m, 5H), 6.97 (t, J=7.8 Hz, 2H), 6.64 (d, J=7.2 Hz, 1H), 6.42 (t, J=7.2 Hz, 1H) ppm.

$^{13}$C NMR ($C_6D_6$): δ 119.44, 125.53, 127.06, 128.34, 129.47, 130.42, 130.46, 133.86, 138.36, 140.34, 142.02, 148.13, 155.59, 164.42 ppm.

HRMS (EI): m/z calcd ([$M^+$] $C_{24}H_{17}BrN_2$) 412.0575. Found: 412.0572.

Preparation was performed by the same method as in Example 1 using the compound (2.08 g, 5.04 mmol), 1-naphthylboronic acid (0.910 g, 5.29 mmol), $Na_2CO_3$ (1.40 g, 13.3 mmol), toluene (8 mL), degassed $H_2O$/EtOH (4.6 mL, v/v, 1:1), and a solution of $(Ph_3P)_4Pd$ (15.7 mg, 0.0136 mmol) in toluene (2 mL). A yellow solid was obtained (2.08 g, 90%).

$^1$H NMR ($C_6D_6$): δ 8.35 (s, 1H, NCH), 8.04 (m, 1H), 7.98 (d, J=7.8 Hz, 1H), 7.65 (m, 1H), 7.60 (d, J=7.8 Hz, 1H), 7.49 (d, J=7.8 Hz, 4H), 7.34 (d, J=7.8 Hz, 2H), 7.32 (d, J=7.2 Hz, 1H), 7.28 (m, 2H), 7.20 (t, J=7.8 Hz, 1H), 7.08 (m, 9H) ppm.

$^{13}$C NMR ($C_6D_6$): δ 119.22, 125.37, 126.01, 126.38, 126.56, 126.94, 128.33, 128.58, 129.21, 130.50, 130.60, 131.71, 134.10, 134.44, 136.75, 138.41, 140.65, 148.55, 154.69, 159.29, 166.55 ppm.

HRMS (EI): m/z calcd ([$M^+$] $C_{34}H_{24}N_2$) 460.1939. Found: 460.1938.

Preparation was performed by the same method as in Example 1 using the compound (0.459 g, 0.996 mmol) and 2-isopropylphenyllithium (0.217 g, 1.72 mmol). A white solid was obtained (0.428 g, 74%).

$^1$H NMR ($C_6D_6$): δ 8.05 (d, J=8.4 Hz, 1H), 7.68 (d, J=8.4 Hz, 1H), 7.64 (d, J=8.4 Hz, 1H), 7.42 (d, J=8.4 Hz, 4H), 7.27 (m, 5H), 7.14 (d, J=7.2 Hz, 2H), 7.01 (m, 10H), 6.89 (m, 2H), 6.71 (d, J=7.8 Hz, 1H), 5.82 (d, J=10.8 Hz, 1H, NCH), 5.22 (d, J=10.8 Hz, 1H, NH), 2.97 (septet, J=6.0 Hz, 1H, CH), 1.01 (d, J=6.0 Hz, 3H, $CH_3$), 0.872 (d, J=6.0 Hz, 3H, $CH_3$) ppm.

$^{13}$C NMR ($C_6D_6$): δ 23.96, 24.65, 28.57, 61.56, 119.97, 120.91, 122.67, 125.36, 125.52, 125.94, 126.19, 126.48, 162.87, 127.11, 127.34, 127.71, 128.44, 128.67, 129.03, 129.71, 130.99, 131.84, 133.29, 134.51, 136.40, 138.97, 140.04, 141.43, 143.23, 146.44, 158.85, 162.62 ppm.

HRMS (EI): m/z calcd ([$M^+$] $C_{43}H_{36}N_2$) 580.2878. Found: 580.2881.

(ii) Preparation of Transition Metal Compound

Preparation was performed by the same method as in Example 1 using the ligand compound (0.199 g, 0.343 mmol), n-BuLi (0.226 mL, a 1.6 M solution in hexane, 0.362 mmol), $HfCl_4$ (0.110 g, 0.345 mmol), MeMgBr (0.39 mL, a 3.1 M solution in diethyl ether, 1.2 mmol) and toluene (2.0 g). A dark yellow solid was obtained (0.178 g, 66%).

$^1$H NMR ($C_6D_6$): δ 8.54 (d, J=7.2 Hz, 1H), 8.33 (d, J=9.6 Hz, 1H), 7.76 (d, J=8.4 Hz, 1H), 7.71 (d, J=8.4 Hz, 1H), 7.57 (d, J=7.8 Hz, 2H), 7.51 (d, J=7.8 Hz, 1H), 7.27 (m, 6H), 7.11 (m, 4H), 7.01 (t, J=7.2 Hz, 1H), 6.96 (d, J=4.2 Hz, 2H), 6.76 (m, 3H), 6.68 (m, 2H), 6.34 (s, 1H, NCH), 6.11 (d, J=7.8 Hz, 1H), 3.15 (septet, J=6.6 Hz, 1H), 1.22 (d, J=6.6 Hz, 3H, $CH_3$), 0.93 (m, 6H, $HfCH_3$, $CH_3$), −0.08 (s, 3H, $HfCH_3$) ppm.

$^{13}$C NMR ($C_6D_6$): δ 23.31, 25.55, 29.13, 64.26, 65.18, 74.07, 118.94, 119.86, 123.91, 124.29, 125.49, 125.74, 126.78, 126.91, 126.94, 127.16, 128.52, 129.69, 130.00, 130.72, 130.75, 131.44, 131.58, 131.95, 134.36, 135.72, 138.33, 139.89, 140.88, 141.19, 141.51, 143.09, 143.65, 146.42, 147.03, 163.90, 170.58, 206.23 ppm.

Anal. calcd. ($C_{45}H_{40}HfN_2$): C, 68.65; H, 5.12; N, 3.56%. Found: C, 68.37; H, 5.49; N, 3.25%.

Example 6

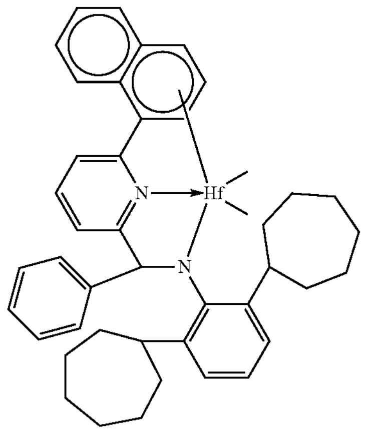

(i) Preparation of Ligand Compound

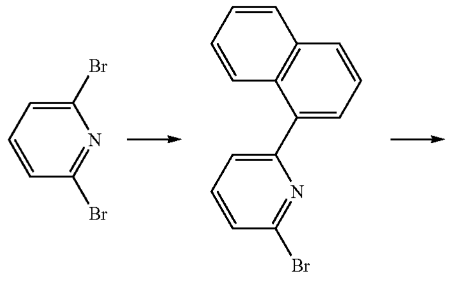

-continued

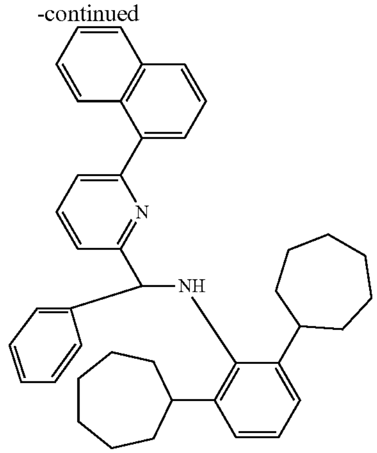

Under $N_2$, a Schlenk flask was charged with 2,6-dibromopyridine (7 g, 29.5 mmol), 1-naphthylboronic acid (2.54 g, 14.8 mmol), $Na_2CO_3$ (3.91 g, 36.9 mmol) and toluene (23 mL). Then, a degassed $H_2O$-EtOH mixture (1:1 [v/v], 4.67 mL) and a solution of $(Ph_3P)_4Pd$ (85.3 mg, 0.0739 mmol in toluene (5 mL) were injected thereto. A two-phase solution was heated to 70° C. and vigorously stirred overnight. After cooling to room temperature, an organic phase was collected and washed with $H_2O$ (20 mL). The product was extracted with toluene (3x20 mL). The organic phase thus collected was dried with anhydrous $MgSO_4$, and a solvent was removed in a rotary evaporator. The product was separated by column chromatography on silica gel using a mixture of hexane and toluene (1:2, v/v). A white solid was obtained (3.1 g, 74%).

$^1$H NMR ($C_6D_6$): δ 8.18 (d, J=8.4 Hz, 1H), 7.64 (d, J=8.4 Hz, 1H), 7.62 (d, J=8.4 Hz, 1H), 7.44 (d, J=6.6 Hz, 1H), 7.23 (m, 3H), 6.97 (d, J=8.4 Hz, 1H), 6.92 (d, J=7.2 Hz, 1H), 6.68 (t, J=7.8 Hz, 1H) ppm.

$^{13}$C NMR ($C_6D_6$): δ 123.76, 125.41, 125.81, 126.21, 126.30, 126.94, 128.35, 128.70, 129.68, 131.41, 134.35, 137.31, 138.37, 142.22, 160.41 ppm. Anal. calcd. ($C_{15}H_{10}BrN$): C, 63.40; H, 3.55; N, 4.93%. Found: C, 63.39; H, 3.66; N, 4.62%.

The compound (0.609 g, 2.14 mmol) was dissolved in THF (8 mL) and cooled to about −78° C. t-BuLi (2.52 mL, a 1.7 M solution in hexane, 4.3 mmol) was introduced, and a mixture was stirred at about −78° C. for 2 hours. Then, a solution of 2,6-(cycloheptyl)$_2C_6H_3N$═C(H)Ph (0.800 g, 2.14 mmol) in THF (16 mL) was added thereto. After stirring at about −78° C. for 3 hours, the temperature of the solution thus produced was slowly raised to room temperature. After stirring overnight, water (10 mL) was added, and a product was extracted with ethyl acetate (3x10 mL). An organic phase was collected and dried with $MgSO_4$. A solvent was removed in a rotary evaporator. Through separation by column chromatography on silica gel using hexane and toluene containing a small amount of triethylamine (v/v, 75:25:1), a lemon yellow solid was obtained (0.412 g, 63%).

$^1$H NMR ($C_6D_6$): δ 8.27 (m, 1H), 7.67 (m, 2H), 7.60 (d, J=7.2 Hz, 3H), 7.28 (m, 3H), 7.18 (m, 2H), 7.10 (m, 6H), 6.89 (m, 1H), 5.32 (d, J=7.2 Hz, 1H, NCH), 5.18 (d, J=7.8 Hz, 1H, NH), 3.04 (m, 2H), 1.81 (m, 4H), 1.55 (m, 8H), 1.37 (m, 8H), 1.18 (m, 4H) ppm.

$^{13}$C NMR ($C_6D_6$): δ 27.65, 27.84, 27.99, 37.20, 37.54, 40.48, 70.57, 120.30, 123.23, 124.06, 124.56, 125.34, 126.15, 126.59, 126.75, 127.17, 128.58, 128.63, 129.40, 131.86, 134.65, 137.10, 138.82, 142.71, 144.07, 144.87, 159.43, 162.82 ppm.

HRMS (EI): m/z calcd ([M+] $C_{42}H_{46}N_2$) 578.3661. Found: 578.3660.

(ii) Preparation of Transition Metal Compound

Preparation was performed by the same method as in Example 1 using the ligand compound (0.120 g, 0.207 mmol), n-BuLi (a 1.6 M solution in hexane, 0.129 mL, 0.219 mmol), $HfCl_4$ (66.7 mg, 0.208 mmol), and MeMgBr (0.24 mL, a 3.0 M solution in diethyl ether, 0.73 mmol). A yellow solid was obtained (0.106 g, 65%).

$^1$H NMR ($C_6D_6$): δ 8.58 (d, J=7.2 Hz, 1H), 8.32 (d, J=8.4 Hz, 1H), 7.78 (d, J=7.2 Hz, 1H), 7.69 (d, J=7.8 Hz, 1H), 7.57 (d, J=7.2 Hz, 1H), 7.32 (m, 1H), 7.27 (m, 1H), 7.20 (m, 3H), 7.05 (m, 5H), 6.87 (t, J=7.8 Hz, 1H), 6.47 (d, J=7.2 Hz, 1H), 5.74 (s, 1H, NCH), 3.46 (m, 1H), 2.92 (m, 1H), 2.33 (m, 1H), 2.11 (m, 2H), 1.89 (m, 1H), 1.82 (m, 1H), 1.62 (m, 9H), 1.25 (m, 9H), 0.97 (s, 3H, $HfCH_3$), 0.66 (s, 3H, $HfCH_3$), 0.63 (m, 1H) ppm.

$^{13}$C NMR ($C_6D_6$): δ 27.23, 27.44, 27.84, 28.12, 28.28, 28.90, 29.02, 37.49, 37.68, 39.85, 39.93, 40.29, 41.19, 62.50, 66.67, 84.17, 119.73, 120.33, 124.12, 125.33, 125.46, 125.52, 126.16, 127.00, 128.93, 129.16, 129.94, 130.03, 130.80, 134.27, 135.78, 140.78, 143.84, 143.92, 143.95, 148.04, 148.32, 164.51, 170.22, 206.25 ppm.

Anal. calcd. ($C_{44}H_{50}HfN_2$): C, 67.29; H, 6.42; N, 3.57%. Found: C, 67.18; H, 6.44; N, 3.31%.

Example 7

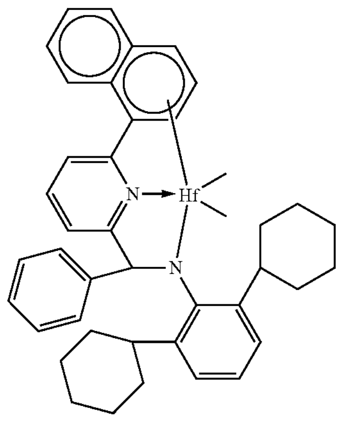

(i) Preparation of Ligand Compound

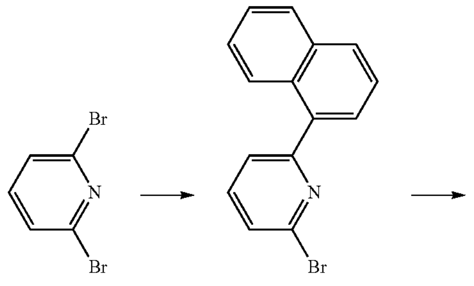

-continued

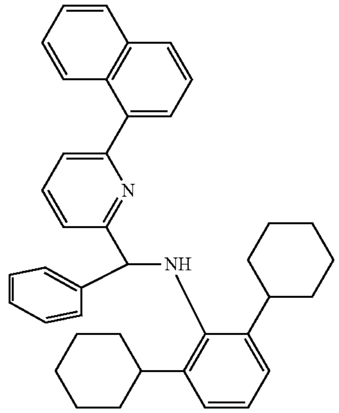

Preparation was performed by the same method as in Example 6 using 2-bromo-6-(naphthalene-1-yl)pyridine (0.156 g, 0.548 mmol), t-BuLi (0.65 mL, a 1.7 M solution in hexane, 1.1 mmol), 2,6-(cyclohexyl)$_2C_6H_3N$═C(H)Ph (0.189 g, 0.548 mmol), and THF (7 mL). Through separation by column chromatography on silica gel using hexane and toluene containing a small amount of triethylamine (v/v, 75:25:1), a pale yellow solid was obtained (0.208 g, 69%).

$^1$H NMR ($C_6D_6$): δ 8.30 (m, 1H), 7.67 (m, 2H), 7.61 (d, J=7.8 Hz, 3H), 7.28 (m, 3H), 7.19 (m, 2H), 7.10 (m, 6H), 6.83 (quintet, J=4.2 Hz, 1H), 5.31 (s, 1H, NCH), 5.24 (s, 1H, NH), 2.89 (m, 2H), 1.75 (d, J=12.6 Hz, 2H), 1.70 (d, J=12.6 Hz, 2H), 1.59 (d, J=13.2 Hz, 2H), 1.55 (d, J=12.6 Hz, 2H), 1.50 (d, J=12.6 Hz, 2H), 1.32 (m, 4H), 1.09 (m, 2H), 0.922 (m, 4H) ppm.

$^{13}$C NMR ($C_6D_6$): δ 26.63, 27.18, 27.49, 34.75, 35.12, 38.98, 70.71, 120.32, 123.19, 123.81, 124.75, 125.38, 126.18, 126.59, 126.71, 127.19, 127.78, 128.60, 129.40, 131.85, 134.64, 137.11, 138.88, 141.90, 144.69, 144.94, 159.38, 162.73 ppm. HRMS (EI): m/z calcd ([M+] $C_{40}H_{42}N_2$) 550.3348. Found: 550.3350.

(ii) Preparation of Transition Metal Compound

Preparation was performed by the same method as in Example 6 using $HfCl_4$ (0.124 g, 0.387 mmol), MeMgBr (0.51 mL, a 3.0 M solution in diethyl ether, 1.6 mmol) and the ligand compound (0.142 g, 0.258 mmol). A yellow solid was obtained (0.140 g, 72%).

$^1$H NMR ($C_6D_6$): δ 8.56 (d, J=8.4 Hz, 1H), 8.29 (d, J=7.8 Hz, 1H), 7.78 (d, J=7.8 Hz, 1H), 7.70 (d, J=7.8 Hz, 1H), 7.54 (d, J=7.2 Hz, 1H), 7.30 (m, 2H), 7.19 (m, 2H), 7.17 (m, 1H), 7.06 (m, 5H), 6.88 (t, J=7.8 Hz, 1H), 6.43 (d, J=7.2 Hz, 1H), 5.79 (s, 1H, NCH), 3.37 (m, 1H), 2.77 (m, 1H), 2.18 (d, J=12.6 Hz, 1H), 2.07 (m, 2H), 1.84 (d, J=12.0 Hz, 1H), 1.77 (d, J=12.0 Hz, 1H), 1.54 (m, 8H), 1.14 (m, 3H), 0.96 (s, 3H, $HfCH_3$), 0.89 (m, 3H), 0.65 (s, 3H, $HfCH_3$), 0.34 (m, 1H) ppm.

$^{13}$C NMR ($C_6D_6$): δ 26.65, 26.74, 27.77, 28.28, 35.17, 35.59, 36.23, 38.00, 38.21, 40.83, 62.51, 66.95, 84.22, 119.46, 120.38, 124.19, 125.52, 125.61, 125.79, 126.05, 126.97, 127.76, 128.92, 129.11, 129.92, 130.00, 130.81, 134.33, 135.78, 140.78, 143.87, 144.00, 145.33, 145.79, 146.65, 164.58, 170.16, 206.09 ppm.

Anal. calcd. ($C_{42}H_{46}HfN_2$): C, 66.61; H, 6.12; N, 3.70%. Found: C, 66.89; H, 6.45; N, 3.51%.

Example 8

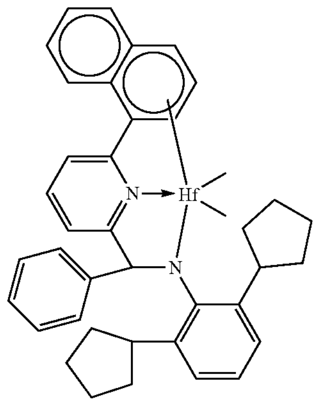

(i) Preparation of Ligand Compound

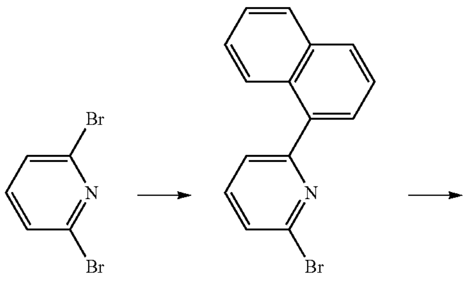

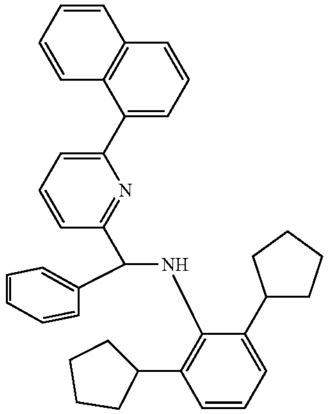

Preparation was performed by the same method as in Example 6 using 2-bromo-6-(naphthalene-1-yl)pyridine (0.493 g, 1.74 mmol), t-BuLi (2.0 mL, a 1.7 M solution in hexane, 3.5 mmol), 2,6-(cyclopentyl)$_2$C$_6$H$_3$N═C(H)Ph (0.551 g, 1.74 mmol), and THF (20 mL). Through separation by column chromatography on silica gel using hexane and toluene containing a small amount of triethylamine (v/v, 75:25:1), a pale yellow solid was obtained (0.637 g, 70%).

$^1$H NMR ($C_6D_6$): δ 8.24 (m, 1H), 7.67 (m, 2H), 7.63 (d, J=7.2 Hz, 2H), 7.56 (d, J=6.6 Hz, 1H), 7.31 (d, J=8.4 Hz, 1H), 7.27 (m, 2H), 7.18 (m, 2H), 7.12 (d, J=6.6 Hz, 2H), 7.05 (m, 4H), 6.75 (m, 1H), 5.60 (d, J=7.2 Hz, 1H, NCH), 5.36 (d, J=8.4 Hz, 1H, NH), 3.37 (m, 2H), 1.87 (m, 2H), 1.78 (m, 2H), 1.58 (m, 4H), 1.49 (m, 4H), 1.26 (m, 4H) ppm.

$^{13}$C NMR ($C_6D_6$): δ 25.93, 25.98, 35.46, 35.53, 40.64, 70.33, 120.66, 123.17, 123.59, 124.68, 125.42, 126.18, 126.53, 126.61, 127.21, 127.68, 127.83, 128.59, 128.63, 129.35, 131.79, 134.59, 136.94, 138.95, 139.70, 144.67, 146.13, 159.25, 162.51 ppm.

HRMS (EI): m/z calcd ([M$^+$] $C_{38}H_{38}N_2$) 522.3035. Found: 522.3033.

(ii) Preparation of Transition Metal Compound

Preparation was performed by the same method as in Example 6 using $HfCl_4$ (0.184 g, 0.587 mmol), MeMgBr (0.76 mL, a 3.0 M solution in diethyl ether, 2.4 mmol) and the ligand compound (0.200 g, 0.383 mmol). A yellow solid was obtained (0.226 g, 81%).

$^1$H NMR ($C_6D_6$): δ 8.57 (d, J=7.8 Hz, 1H), 8.24 (d, J=8.4 Hz, 1H), 7.80 (d, J=7.8 Hz, 1H), 7.71 (d, J=7.2 Hz, 1H), 7.47 (d, J=8.4 Hz, 1H), 7.27 (m, 3H), 7.19 (t, J=7.8 Hz, 1H), 7.14 (m, 1H), 7.01 (m, 5H), 6.80 (t, J=4.2 Hz, 1H), 6.40 (d, J=7.8 Hz, 1H), 5.93 (s, 1H, NCH), 3.74 (m, 1H), 3.43 (quintet, J=9.6 Hz, 1H), 2.40 (m, 1H), 2.20 (m, 1H), 2.10 (m, 1H), 1.69 (m, 8H), 1.33 (m, 3H), 1.06 (m, 1H), 0.91 (s, 3H, $HfCH_3$), 0.66 (s, 3H, $HfCH_3$), 0.34 (m, 1H) ppm.

$^{13}$C NMR ($C_6D_6$): δ 26.18, 26.22, 26.86, 27.19, 36.74, 37.53, 39.17, 40.67, 41.04, 62.26, 66.85, 84.05, 119.56, 120.49, 124.17, 125.10, 125.51, 125.85, 126.26, 126.96, 128.91, 129.04, 129.91, 129.98, 130.74, 134.15, 135.73, 140.82, 143.94, 144.04, 145.01, 145.67, 146.68, 164.60, 170.03, 205.87 ppm.

Anal. calcd. ($C_{40}H_{42}HfN_2$): C, 65.88; H, 5.80; N, 3.84%. Found: C, 65.94; H, 5.72; N, 3.75%.

Comparative Example 1

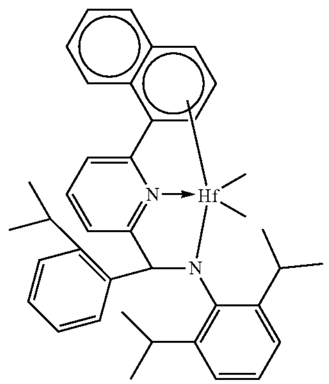

The above compound was prepared according to a known method.

Comparative Example 2

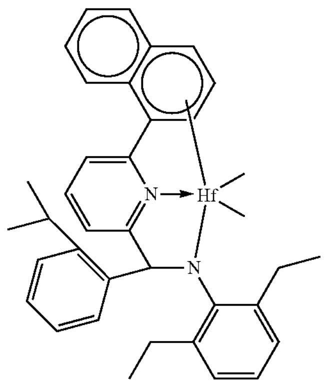

(i) Preparation of Ligand Compound

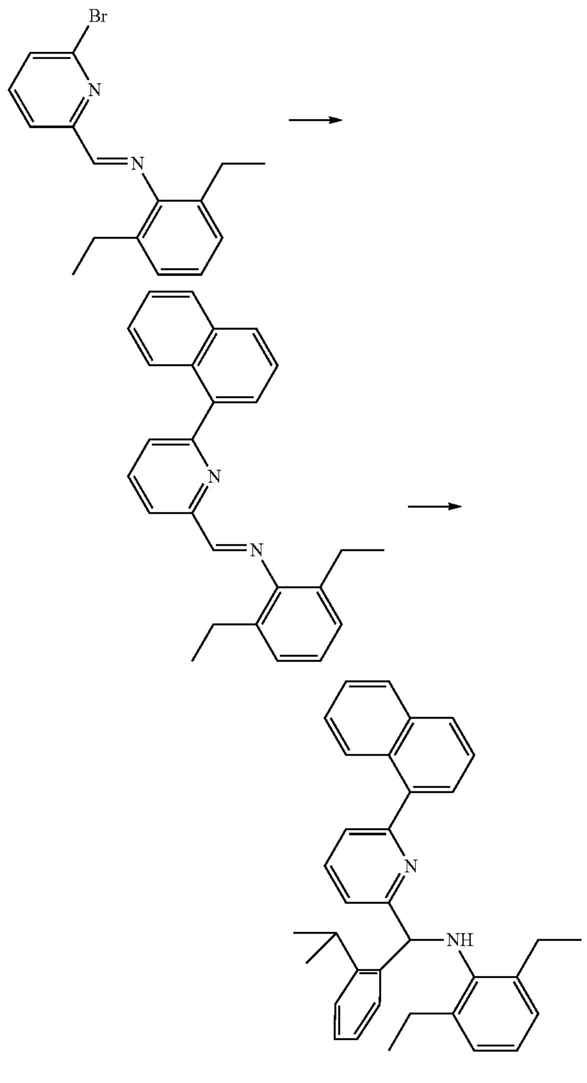

Preparation was performed by the same method as in Example 1 using 2,6-diethylaniline (1.50 g, 10.1 mmol), 6-bromo-2-pyridinecarboxaldehyde (1.87 g, 10.1 mmol) and toluene (15 mL). A lemon yellow solid was obtained (2.51 g, 79%).

$^1$H NMR ($C_6D_6$): δ 8.23 (s, 1H, NCH), 7.96 (d, J=7.2 Hz, 1H), 7.01 (s, 3H), 6.87 (d, J=7.8 Hz, 1H), 6.62 (t, J=8.4 Hz, 1H), 2.44 (quartet, J=7.2 Hz, 4H, $CH_2$), 1.06 (t, J=7.8 Hz, 6H, $CH_3$) ppm.

$^{13}$C NMR ($C_6D_6$): δ 14.88, 25.13, 119.46, 125.02, 126.84, 129.70, 132.90, 138.73, 142.29, 149.89, 155.89, 162.16 ppm.

HRMS (EI): m/z calcd ([$M^+$] $C_{16}H_{17}BrN_2$) 316.0575. Found: 316.0574.

Preparation was performed by the same method as in Example 1 using the compound (2.34 g, 7.02 mmol), 1-naphthylboronic acid (1.27 g, 7.37 mmol), $Na_2CO_3$ (1.96 g, 18.5 mmol), toluene (10 mL), degassed $H_2O$/EtOH (6.5 mL, v/v, 1:1), and a solution of $(Ph_3P)_4Pd$ (21.9 mg, 0.0190 mmol) in toluene (2 mL). Through recrystallization in hexane and toluene at −30° C., an analytically pure compound was obtained. A yellow solid was obtained (2.35 g, 92%).

$^1$H NMR ($C_6D_6$): δ 8.56 (s, 1H, NCH), 8.33 (d, J=7.2 Hz, 1H), 8.29 (m, 1H), 7.69 (t, J=2.4 Hz, 1H), 7.67 (d, J=8.4 Hz, 1H), 7.58 (d, J=6.6 Hz, 1H), 7.26 (m, 5H), 7.04 (m, 3H), 2.56 (quartet, J=7.2 Hz, 4H, $CH_2$), 1.14 (t, J=7.2 Hz, 6H, $CH_3$) ppm.

$^{13}$C NMR ($C_6D_6$): δ 14.93, 25.26, 119.24, 124.76, 125.54, 126.17, 126.19, 126.69, 126.83, 128.17, 128.76, 129.37, 131.80, 133.06, 134.53, 136.97, 138.69, 150.49, 155.13, 159.66, 164.12 ppm.

HRMS (EI): m/z calcd ([$M^+$] $C_{26}H_{24}N_2$) 364.1939. Found: 364.1938.

Preparation was performed by the same method as in Example 1 using the compound (0.400 g, 1.10 mmol) and 2-isopropylphenyllithium (0.239 g, 1.90 mmol). A lemon yellow solid was obtained (0.432 g, 82%).

$^1$H NMR ($C_6D_6$): δ 8.18 (m, 1H), 7.79 (m, 1H), 7.66 (m, 1H), 7.64 (d, J=7.8 Hz, 1H), 7.50 (d, J=7.8 Hz, 1H), 7.27 (m, 3H), 7.18 (m, 2H), 7.14 (m, 2H), 7.01 (m, 5H), 5.83 (s, 1H, NCH), 4.78 (s, 1H, NH), 3.33 (septet, J=6.6 Hz, 1H, CH), 2.50 (m, 4H, $CH_2$), 1.02 (m, 12H, $CH_3$) ppm.

$^{13}$C NMR ($C_6D_6$): δ 14.95, 23.99, 24.84, 25.05, 28.93, 65.42, 120.00, 122.97, 123.18, 125.40, 125.86, 126.07, 126.37, 126.60, 126.62, 127.09, 127.69, 127.84, 128.58, 129.28, 131.88, 134.57, 136.90, 137.01, 138.95, 141.42, 145.44, 146.52, 159.21, 163.41 ppm.

HRMS (EI): m/z calcd ([$M^+$] $C_{35}H_{36}N_2$) 484.2878. Found: 484.2876.

(ii) Preparation of Transition Metal Compound

A Schlenk flask was charged with the $HfCl_4$ (0.189 g, 0.588 mmol) and toluene (5 mL). Under $N_2$, the temperature was reduced to about −78° C., and MeMgBr (0.78 mL, a 3.1 M solution in diethyl ether, 2.4 mmol) was added thereto dropwisely. The mixture was stirred at −40 to −35° C. for 1 hour to precipitate a white solid. The temperature was reduced to about −78° C. again, and a solution of the ligand compound (0.190 g, 0.392 mmol) in toluene (5 mL) was added thereto dropwisely. After stirring the mixture thus produced at −40 to −35° C. for 2 hour, the temperature was slowly raised to room temperature. After stirring overnight, all volatile materials were removed through a vacuum line. A product was extracted with toluene (10 mL). The extract was filtered on a celite and collected. After removing a solvent through a vacuum line, the residue was softened in hexane (2 mL). A yellow solid was obtained (0.170 g, 63%).

$^1$H NMR ($C_6D_6$): δ 8.58 (d, J=7.2 Hz, 1H), 8.35 (d, J=9.0 Hz, 1H), 7.82 (d, J=8.4 Hz, 1H), 7.73 (d, J=7.8 Hz, 1H), 7.56

(d, J=7.8 Hz, 1H), 7.36 (t, J=7.2 Hz, 1H), 7.30 (t, J=6.6 Hz, 1H), 7.22 (d, J=7.8 Hz, 1H), 7.14 (d, J=7.8 Hz, 1H), 7.09 (t, J=7.8 Hz, 2H), 7.04 (m, 2H), 6.93 (t, J=7.8 Hz, 1H), 6.84 (t, J=7.8 Hz, 1H), 6.60 (s, 1H, NCH), 6.47 (d, J=7.8 Hz, 1H), 2.83 (m, 4H, $CH_2$), 2.41 (m, 1H, CH), 1.30 (t, J=7.8 Hz, 3H, $CH_3$), 1.14 (d, J=6.6 Hz, 3H, $CH_3$), 0.82 (s, 3H, $HfCH_3$), 0.68 (d, J=6.6 Hz, 3H, $CH_3$), 0.62 (t, J=7.2 Hz, 3H, $CH_3$), 0.56 (s, 3H, $HfCH_3$) ppm.

$^{13}C$ NMR ($C_6D_6$): δ 14.88, 15.20, 22.85, 24.20, 24.34, 25.57, 28.61, 63.61, 64.75, 74.63, 120.14, 120.30, 124.20, 125.33, 125.54, 126.01, 126.42, 126.71, 126.85, 127.01, 129.91, 130.05, 130.57, 130.70, 134.30, 135.76, 140.67, 140.76, 142.33, 143.79, 143.83, 144.26, 147.16, 164.52, 171.23, 205.38 ppm.

Anal. calcd. ($C_{37}H_{40}HfN_2$): C, 64.29; H, 5.83; N, 4.05%. Found: C, 64.41; H, 6.05; N, 3.86%.

Comparative Example 3

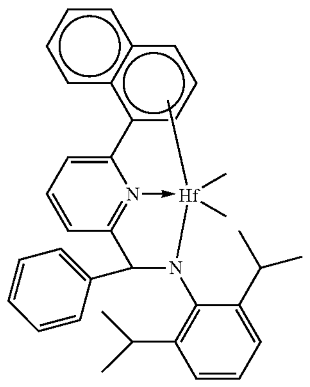

(i) Preparation of Ligand Compound

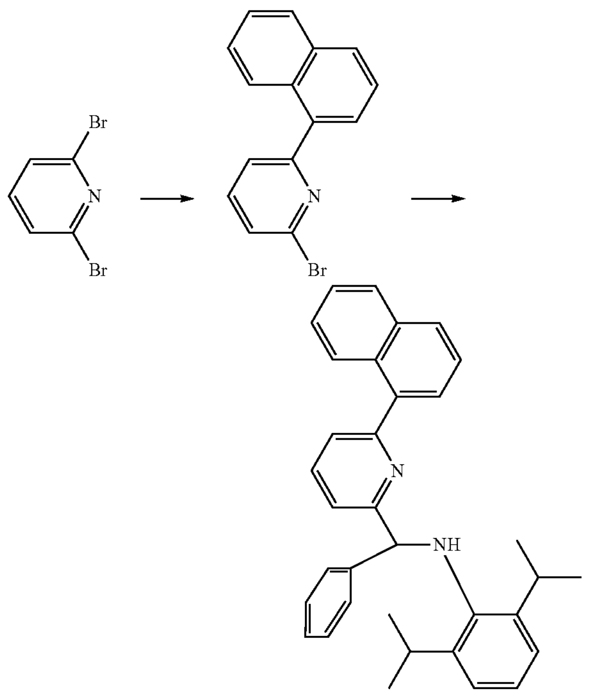

Preparation was performed by the same method as in Example 6 using 2-bromo-6-(naphthalene-1-yl)pyridine (0.220 g, 0.774 mmol), t-BuLi (0.91 mL, a 1.7 M solution in hexane, 1.6 mmol), 2,6-$Et_2C_6H_3N$=C(H)Ph (0.184 g, 0.774 mmol), and THF (10 mL). By separating using column chromatography on silica gel using hexane and toluene containing a small amount of triethylamine (v/v, 75:25:1), a pale yellow solid was obtained (0.210 g, 61%).

$^1H$ NMR ($C_6D_6$): δ 8.21 (m, 1H), 7.68 (m, 2H), 7.54 (d, J=7.2 Hz, 1H), 7.51 (d, J=8.4 Hz, 2H), 7.30 (t, J=7.2 Hz, 1H), 7.26 (m, 2H), 7.11 (t, J=7.8 Hz, 2H), 7.05 (m, 2H), 7.00 (m, 3H), 6.93 (m, 1H), 6.80 (m, 1H), 5.59 (d, J=8.4 Hz, 1H, NCH), 5.52 (d, J=8.4 Hz, 1H, NH), 2.62 (m, 4H, $CH_2$), 1.06 (t, J=6.6 Hz, 6H, $CH_3$) ppm.

$^{13}C$ NMR ($C_6D_6$): δ 14.82, 25.47, 68.09, 120.75, 122.56, 123.35, 125.48, 126.16, 126.50, 126.63, 127.09, 127.24, 127.73, 127.81, 128.60, 128.65, 129.28, 131.84, 134.54, 136.08, 136.94, 139.08, 144.24, 144.89, 159.17, 162.33 ppm. HRMS (EI): m/z calcd ([$M^+$] $C_{32}H_{30}N_2$) 442.2409. Found: 442.2408.

(ii) Preparation of Transition Metal Compound

Preparation was performed by the same method as in Example 6 using $HfCl_4$ (0.0709 g, 0.221 mmol), MeMgBr (0.29 mL, a 3.0 M solution in diethyl ether, 0.91 mmol) and the ligand compound (0.0653 g, 0.148 mmol). A yellow solid was obtained (0.0628 g, 66%).

$^1H$ NMR ($C_6D_6$): δ 8.57 (d, J=7.2 Hz, 1H), 8.35 (d, J=8.4 Hz, 1H), 7.82 (d, J=7.8 Hz, 1H), 7.73 (d, J=8.4 Hz, 1H), 7.56 (d, J=8.4 Hz, 1H), 7.36 (t, J=7.2 Hz, 1H), 7.30 (t, J=7.8 Hz, 1H), 7.23 (d, J=7.2 Hz, 1H), 7.18 (m, 1H), 7.12 (d, J=7.8 Hz, 1H), 6.96 (m, 3H), 6.83 (m, 3H), 6.36 (d, J=7.8 Hz, 1H), 5.93 (s, 1H, NCH), 2.84 (sextet, J=7.2 Hz, 1H, $CH_2$), 2.78 (sextet, J=7.8 Hz, 1H, $CH_2$), 2.69 (sextet, J=6.6 Hz, 1H, $CH_2$), 2.38 (sextet, J=6.6 Hz, 1H, $CH_2$), 1.32 (t, J=7.8 Hz, 3H, $CH_3$), 0.80 (s, 3H, $HfCH_3$), 0.61 (t, J=7.2 Hz, 3H, $CH_3$), 0.55 (s, 3H, $HfCH_3$) ppm.

$^{13}C$ NMR ($C_6D_6$): δ 15.28, 15.68, 24.37, 63.72, 64.58, 81.45, 120.29, 120.49, 124.13, 125.56, 126.09, 126.69, 126.74, 127.05, 127.82, 128.76, 129.38, 129.90, 130.06, 130.65, 134.32, 135.74, 140.68, 142.53, 143.15, 143.73, 144.00, 144.24, 164.59, 170.07, 205.27 ppm.

Anal. calcd. ($C_{34}H_{34}HfN_2$): C, 62.91; H, 5.28; N, 4.32%. Found: 0, 63.13; H, 5.50; N, 4.41%.

Comparative Example 4

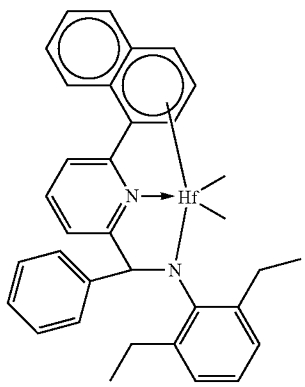

(i) Preparation of Ligand Compound

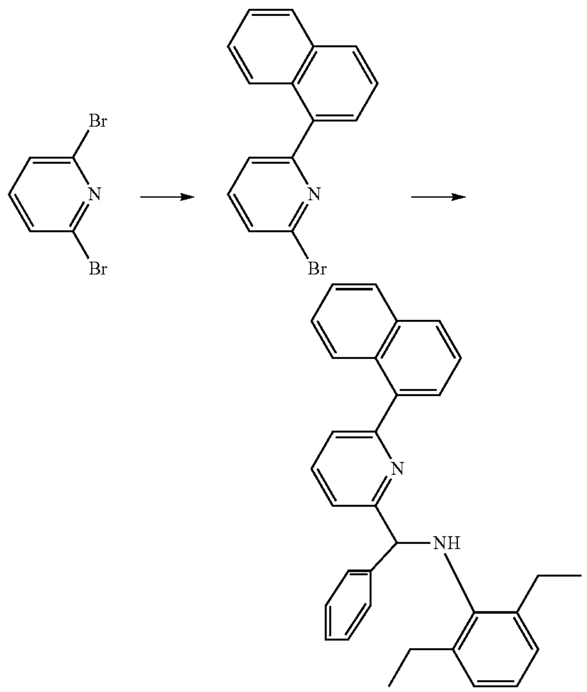

Preparation was performed by the same method as in Example 6 using 2-bromo-6-(naphthalene-1-yl)pyridine (0.220 g, 0.774 mmol), t-BuLi (0.91 mL, a 1.7 M solution in hexane, 1.6 mmol), 2,6-$Et_2C_6H_3N{=}C(H)Ph$ (0.184 g, 0.774 mmol), and THF (10 mL). By separating using column chromatography on silica gel using hexane and toluene containing a small amount of triethylamine (v/v, 75:25:1), a pale yellow solid was obtained (0.210 g, 61%).

$^1H$ NMR ($C_6D_6$): δ 8.21 (m, 1H), 7.68 (m, 2H), 7.54 (d, J=7.2 Hz, 1H), 7.51 (d, J=8.4 Hz, 2H), 7.30 (t, J=7.2 Hz, 1H), 7.26 (m, 2H), 7.11 (t, J=7.8 Hz, 2H), 7.05 (m, 2H), 7.00 (m, 3H), 6.93 (m, 1H), 6.80 (m, 1H), 5.59 (d, J=8.4 Hz, 1H, NCH), 5.52 (d, J=8.4 Hz, 1H, NH), 2.62 (m, 4H, $CH_2$), 1.06 (t, J=6.6 Hz, 6H, $CH_3$) ppm.

$^{13}C$ NMR ($C_6D_6$): δ 14.82, 25.47, 68.09, 120.75, 122.56, 123.35, 125.48, 126.16, 126.50, 126.63, 127.09, 127.24, 127.73, 127.81, 128.60, 128.65, 129.28, 131.84, 134.54, 136.08, 136.94, 139.08, 144.24, 144.89, 159.17, 162.33 ppm. HRMS (EI): m/z calcd ($[M^+]$ $C_{32}H_{30}N_2$) 442.2409. Found: 442.2408.

(ii) Preparation of Transition Metal Compound

Preparation was performed by the same method as in Example 6 using $HfCl_4$ (0.0709 g, 0.221 mmol), MeMgBr (0.29 mL, a 3.0 M solution in diethyl ether, 0.91 mmol) and 31 (0.0653 g, 0.148 mmol). A yellow solid was obtained (0.0628 g, 66%).

$^1H$ NMR ($C_6D_6$): δ 8.57 (d, J=7.2 Hz, 1H), 8.35 (d, J=8.4 Hz, 1H), 7.82 (d, J=7.8 Hz, 1H), 7.73 (d, J=8.4 Hz, 1H), 7.56 (d, J=8.4 Hz, 1H), 7.36 (t, J=7.2 Hz, 1H), 7.30 (t, J=7.8 Hz, 1H), 7.23 (d, J=7.2 Hz, 1H), 7.18 (m, 1H), 7.12 (d, J=7.8 Hz, 1H), 6.96 (m, 3H), 6.83 (m, 3H), 6.36 (d, J=7.8 Hz, 1H), 5.93 (s, 1H, NCH), 2.84 (sextet, J=7.2 Hz, 1H, $CH_2$), 2.78 (sextet, J=7.8 Hz, 1H, $CH_2$), 2.69 (sextet, J=6.6 Hz, 1H, $CH_2$), 2.38 (sextet, J=6.6 Hz, 1H, $CH_2$), 1.32 (t, J=7.8 Hz, 3H, $CH_3$), 0.80 (s, 3H, $HfCH_3$), 0.61 (t, J=7.2 Hz, 3H, $CH_3$), 0.55 (s, 3H, $HfCH_3$) ppm.

$^{13}C$ NMR ($C_6D_6$): δ 15.28, 15.68, 24.37, 63.72, 64.58, 81.45, 120.29, 120.49, 124.13, 125.56, 126.09, 126.69, 126.74, 127.05, 127.82, 128.76, 129.38, 129.90, 130.06, 130.65, 134.32, 135.74, 140.68, 142.53, 143.15, 143.73, 144.00, 144.24, 164.59, 170.07, 205.27 ppm.

Anal. calcd. ($C_{34}H_{34}HfN_2$): C, 62.91; H, 5.28; N, 4.32%. Found: 0, 63.13; H, 5.50; N, 4.41%.

Polymerization of Ethylene/Alpha-Olefin Copolymer

A bomb reactor (125 mL) was emptied at 60° C. for 1 hour. After charging the bomb reactor with an ethylene gas under an atmospheric pressure, a solution of $Me_3Al$ (28.8 mg, 200 μmol-Al) in methylcyclohexane (15.5 g) was added to the reactor. The mixture thus obtained was stirred at 100° C. for 1 hour using a mantle, and then, a solution was removed using a cannular. The reactor was emptied again to remove remaining solvents, and recharged with an ethylene gas under an atmospheric pressure. This procedure was performed for purge catalyst poison.

The reactor was charged with methylcyclohexane (15.5 g) containing MMAO (AkzoNobel, 6.7 wt %-Al in heptane, 20 mg, 50 μmol-Al), and the temperature was set to 80° C. A solution of $(1\text{-hexyl})_2Zn$ (150 μmol) in methylcyclohexane (10.0 g) was supplied. Then, a methylcyclohexane solution (0.30 g) containing each transition metal compound (1.0 μmol-Hf) of the Examples or Comparative Examples activated with $[(C_{18}H_{37})_2N(H)Me]^+[B(C_6F_5)_4]^-$ (1.0 eq) in benzene was injected.

The reactor was charged with an ethylene/propylene mixture gas (15 bar/10 bar, total 25 bar) at 23 bar in a tank, and polymerization was performed at 80-90° C. for 70 minutes. The remaining ethylene/propylene mixture gas was exhausted, and through drying in a vacuum oven of 160° C. overnight, an ethylene/propylene copolymer was obtained.

Experimental Example 1

(1) Yield (g)

The weights of the ethylene/alpha-olefin copolymers prepared through the Experimental Example were measured, and yields were calculated.

(2) Propylene Content

Measurement was conducted by $^1H$ NMR spectrum.

(3) Weight Average Molecular Weight (Mw), Number Average Molecular Weight (Mn) and Molecular Weight Distribution (MWD)

Measurement was conducted by GPC using trichlorobenzene at 160° C. and standardizing by polystyrene. By using Mw and Mn thus measured, MWD was calculated by dividing a Mw value by a Mn value.

TABLE 1

| Catalyst | $(hexyl)_2Zn$ (μmol) | Yield (g) | $[C_3H_6]$ (mol %) | Mn (kDa) | MWD |
|---|---|---|---|---|---|
| Example 1 | 150 | 10.2 | 20 | 28 | 1.9 |
| Example 2 | 150 | 10.0 | 20 | 33 | 1.7 |
| Example 3 | 150 | 8.1 | 18 | 25 | 1.4 |
| Example 4 | 150 | 9.0 | 18 | 18 | 1.8 |
| Example 5 | 150 | 8.8 | 19 | 22 | 1.5 |
| Example 6 | 150 | 7.0 | 14 | 22 | 1.6 |
| Example 7 | 150 | 7.7 | 16 | 19 | 1.5 |
| Example 8 | 150 | 6.2 | 16 | 19 | 1.4 |
| Comparative Example 1 | 150 | 6.0 | 20 | 27 | 1.8 |
| Comparative Example 2 | 150 | 5.8 | 18 | 19 | 1.4 |
| Comparative Example 3 | 150 | 5.3 | 16 | 19 | 1.4 |

TABLE 1-continued

| Catalyst | (hexyl)$_2$Zn (μmol) | Yield (g) | [$C_3H_6$] (mol %) | Mn (kDa) | MWD |
|---|---|---|---|---|---|
| Comparative Example 4 | 150 | 3.9 | 14 | 14 | 1.5 |

From the polymerization results, the transition metal compounds of the Examples generally showed higher catalyst activity when compared with the transition metal compounds of the Comparative Examples, and could prepare ethylene/alpha-olefin copolymers with excellent yields.

For example, the transition metal compounds of Examples 1 and 2 could be used for polymerization for longer time when compared with Comparative Example 1. Particularly, it could be found that the monomer was hardly consumed after the lapse of 40 minutes in Comparative Example 1, and on the contrary, the monomer was steadily consumed until about 70 minutes in Examples 1 and 2.

Figure 9:
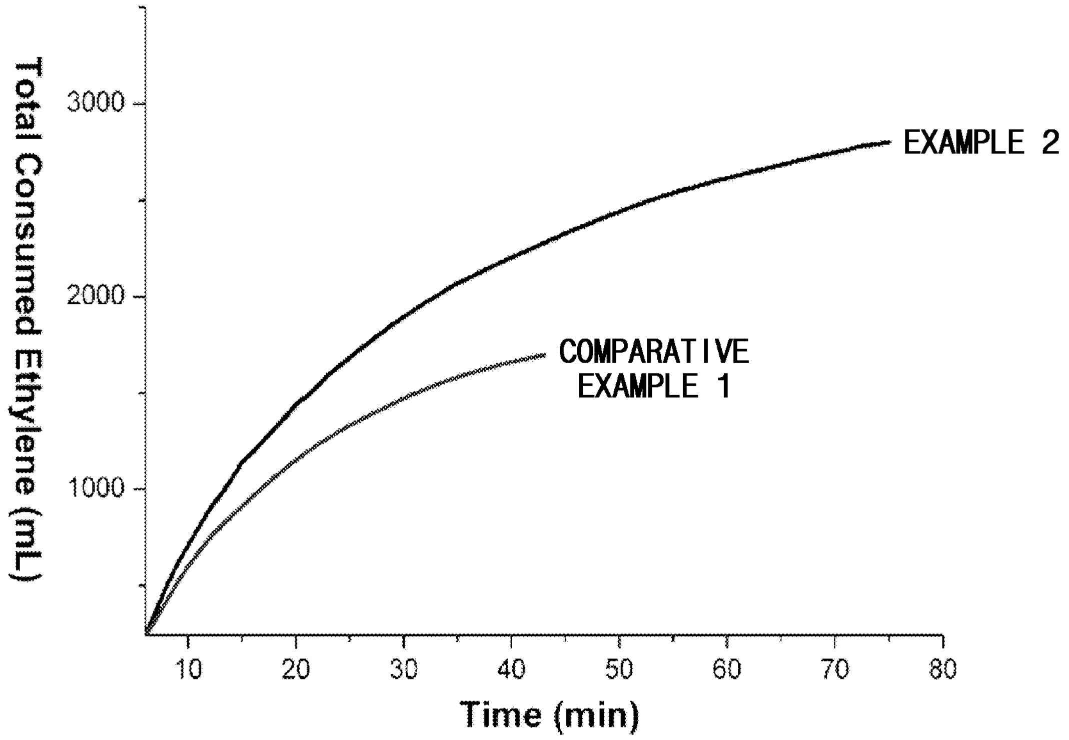
FIG. 9 shows a graph on ethylene consumed amount in accordance with time for Example 2 and Comparative Example 1 using a mass flow controller (MFC).

In addition, referring to FIG. 9, an experiment on observing the consuming ratio of ethylene using a mass flow controller was conducted by supplying ethylene with a constant pressure (10 bar) instead of the ethylene-propylene gas mixture, and it was confirmed that the transition metal compound of Example 2 maintained catalyst activity for a longer time when compared with the transition metal compound of Comparative Example 1.

The invention claimed is:

1. A transition metal compound represented by the following Formula 1:

[Formula 1]

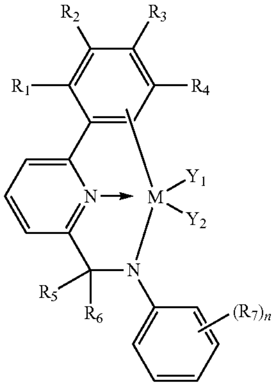

in Formula 1,

M is Ti, Zr or Hf, $R_1$ to $R_4$ are each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where adjacent two or more among $R_1$ to $R_4$ are optionally connected with each other to form a ring, $R_5$ and $R_6$ are each independently hydrogen; a substituted or unsubstituted alkyl group of 1 to 20 carbon atoms; a substituted or unsubstituted cycloalkyl group of 3 to 20 carbon atoms; or a substituted or unsubstituted aryl group of 6 to 20 carbon atoms, where the substitution is conducted with an alkyl group of 1 to 12 carbon atoms, each $R_7$ is independently a substituted or unsubstituted cycloalkyl group of 4 to 20 carbon atoms; or a substituted or unsubstituted aryl group of 6 to 20 carbon atoms, n is 1 to 5, and $Y_1$ and $Y_2$ are each independently a halogen group; a substituted or unsubstituted alkyl group of 1 to 20 carbon atoms; a substituted or unsubstituted alkenyl group of 2 to 20 carbon atoms;

a substituted or unsubstituted alkynyl group or 2 to 20 carbon atoms; a substituted or unsubstituted cycloalkyl group of 3 to 20 carbon atoms; a substituted or unsubstituted aryl group of 6 to 20 carbon atoms; a substituted or unsubstituted alkylaryl group of 7 to 20 carbon atoms; a substituted or unsubstituted arylalkyl group of 7 to 20 carbon atoms; a substituted or unsubstituted heteroaryl group of 5 to 20 carbon atoms; a substituted or unsubstituted alkoxy group of 1 to 20 carbon atoms; a substituted or unsubstituted aryloxy group of 6 to 20 carbon atoms; a substituted or unsubstituted alkylamino group of 1 to 20 carbon atoms; a substituted or unsubstituted arylamino group of 5 to 20 carbon atoms; a substituted or unsubstituted alkylthio group of 1 to 20 carbon atoms; a substituted or unsubstituted arylthio group of 5 to 20 carbon atoms; a substituted or unsubstituted alkylsilyl group of 1 to 20 carbon atoms; a substituted or unsubstituted arylsilyl group of 5 to 20 carbon atoms; a hydroxyl group; an amino group; a thio group; a silyl group; a cyano group; or a nitro group.

2. The transition metal compound according to claim 1, wherein

M is Hf, $R_1$ to $R_4$ are each independently hydrogen; or a substituted or unsubstituted alkyl group of 1 to 20 carbon atoms, where adjacent two or more among $R_1$ to $R_4$ are optionally connected with each other to form a ring, $R_5$ and $R_6$ are each independently hydrogen; or a substituted or unsubstituted aryl group of 6 to 20 carbon atoms, where the substitution is conducted with an alkyl group of 1 to 6 carbon atoms, each $R_7$ is independently a substituted or unsubstituted cycloalkyl group of 4 to 20 carbon atoms; or a substituted or unsubstituted aryl group of 6 to 20 carbon atoms, n is 1 to 3, and $Y_1$ and $Y_2$ are each independently an alkyl group of 1 to 20 carbon atoms.

3. The transition metal compound according to claim 1, wherein M is Hf, $R_1$ and $R_2$ are each independently an alkyl group of 1 to 20 carbon atoms and are connected to each other to form an aromatic ring of 5 to 20 carbon atoms, $R_3$ and $R_4$ are hydrogen, $R_5$ and $R_6$ are each independently hydrogen; or a substituted or unsubstituted aryl group of 6 to 20 carbon atoms, where the substitution is conducted with an alkyl group of 1 to 6 carbon atoms, each $R_7$ is independently a substituted or unsubstituted cycloalkyl group of 4 to 20 carbon atoms; or a substituted or unsubstituted aryl group of 6 to 20 carbon atoms, n is 2, and $Y_1$ and $Y_2$ are each independently an alkyl group of 1 to 20 carbon atoms.

4. The transition metal compound according to claim 1, wherein the transition metal compound represented by Formula 1 is represented by the following Formula la:

[Formula 1a]
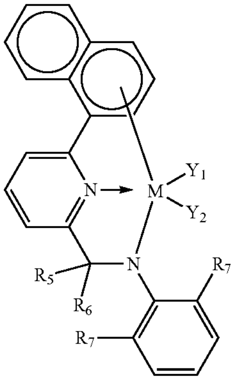
in Formula 1a,
M, $R_5$ to $R_7$, $Y_1$ and $Y_2$ are the same as defined in claim 1.
5. The transition metal compound according to claim 1, wherein the transition metal compound represented by Formula 1 is selected from the following compounds:
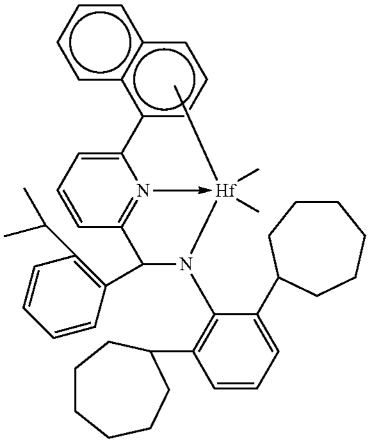
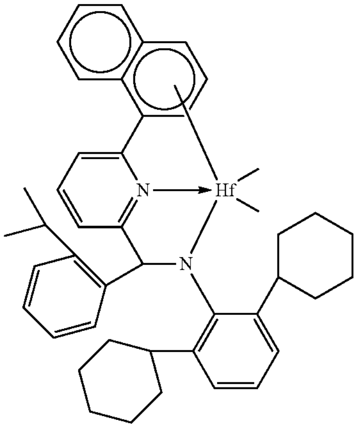
-continued
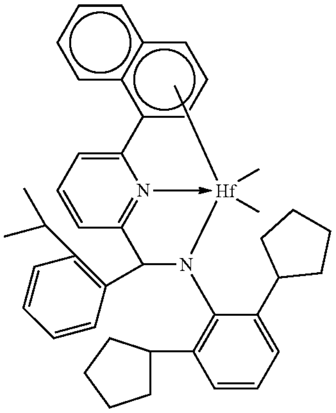
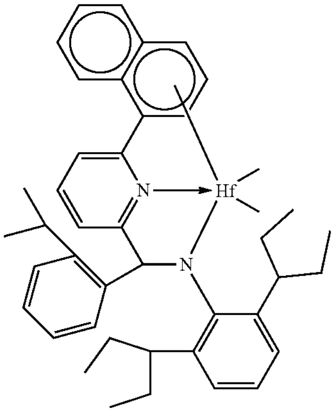
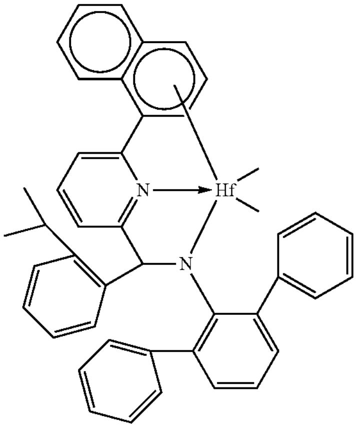
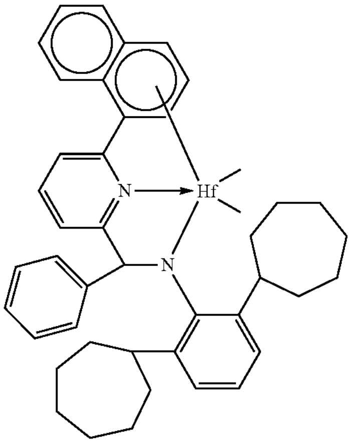

-continued

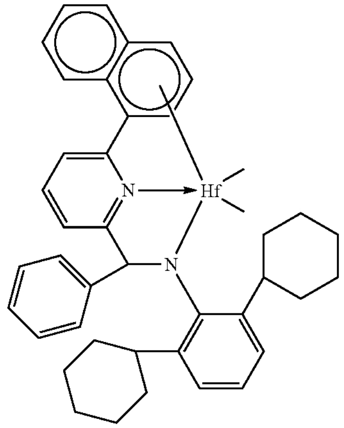

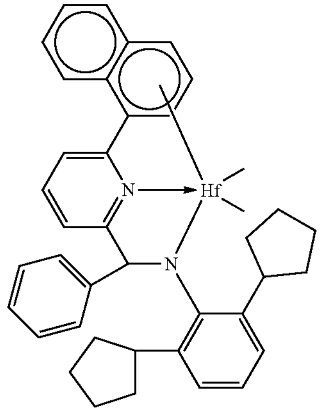

.

6. A catalyst composition comprising the transition metal compound of claim 1, and a cocatalyst.

7. The catalyst composition according to claim 6, wherein the cocatalyst comprises one or more selected from the following Formulae 4 to 6:

$—[Al(R_a)—O]_m—$ [Formula 4]

$D(R_a)_3$ [Formula 5]

$[L\text{-}H]^+[Z(A)_4]^-$ or $[L]^+[Z(A)_4]^-$ [Formula 6]

in the above formulae, each $R_a$ is independently a halogen radical; a hydrocarbyl radical of 1 to 20 carbon atoms; or a halogen-substituted hydrocarbyl radical of 1 to 20 carbon atoms, m is an integer of 2 or more, D is aluminum or boron, L is a neutral or cationic Lewis acid, Z is an element in group 13, each A is independently an aryl group of 6 to 20 carbon atoms or an alkyl group of 1 to 20 carbon atoms, where one or more hydrogen atoms are optionally substituted with substituents, and the substituent of A is halogen; hydrocarbyl of 1 to 20 carbon atoms; alkoxy of 1 to 20 carbon atoms; or aryloxy of 6 to 20 carbon atoms.

8. A method for preparing an olefin polymer, the method comprising:

polymerizing an olefin monomer in the presence of the catalyst composition of claim 6.

9. The method of claim 8, wherein the olefin monomer is one or more selected from the group consisting of ethylene, propylene, 1-butene, 1-pentene, 4-methyl-1-pentene, 1-hexene, 1-heptene, 1-octene, 1-decene, 11-undecene, 11-dodecene, 11-tetradecene, 11-hexadecene and 1-eicosene.

* * * * *